United States Patent
Kniazev et al.

(10) Patent No.: US 9,581,981 B2
(45) Date of Patent: Feb. 28, 2017

(54) METHOD AND APPARATUS FOR PRECONDITIONED CONTINUATION MODEL PREDICTIVE CONTROL

(71) Applicants: Mitsubishi Electric Research Laboratories, Inc., Cambridge, MA (US); Mitsubishi Electric Corporation, Chiyuda-ku, Tokyo (JP)

(72) Inventors: Andrei Kniazev, Cambridge, MA (US); Yuta Fujii, Tokyo (JP)

(73) Assignees: Mitsubishi Electric Corporation, Tokyo (JP); Mitsubishi Electric Research Laboratories, Inc., Cambridge, MA (US)

( * ) Notice: Subject to any disclaimer, the term of this patent is extended or adjusted under 35 U.S.C. 154(b) by 436 days.

(21) Appl. No.: 14/199,459

(22) Filed: Mar. 6, 2014

(65) Prior Publication Data

US 2015/0253749 A1    Sep. 10, 2015

(51) Int. Cl.
G05B 13/04    (2006.01)
G06F 17/16    (2006.01)
G06F 17/11    (2006.01)

(52) U.S. Cl.
CPC .......... *G05B 13/048* (2013.01); *G05B 13/04* (2013.01); *G06F 17/11* (2013.01); *G06F 17/16* (2013.01)

(58) Field of Classification Search
None
See application file for complete search history.

(56) References Cited

U.S. PATENT DOCUMENTS 7,418,372 B2    8/2008    Nishira et al.
2012/0221301 A1    8/2012    Umeda et al.

OTHER PUBLICATIONS

Richter et al., "Continuation Methods: Theory and Applications" 1983, IEEE, pp. 347-352.*
Takuma Tanida and Toshiyuki Ohtsuka, "Preconditioned C/GMRES Algorithm for Nonlinear Receding Horizon Control of Hovercrafts Connected by a String," Proceedings of the 2004 IEEE International Conference on Control Applications, Taipei, Taiwan, Sep. 2-4,200, pp. 1609-1614. DOI: 10.1109/CCA.2004.1387606.
Toshiyuki Ohtsuka, "A Continuation/GMRES Method for Fast Computation of Nonlinear Receding Horizon Control," Automatica, vol. 40, No. 4, Apr. 2004, pp. 563-574, DOI:10.1016/j.automatica. 2003.11.005.

* cited by examiner

*Primary Examiner* — Qing Wu
(74) *Attorney, Agent, or Firm* — Gene Vinokur; James McAleenan; Hironori Tsukamoto

(57) ABSTRACT

A method for a continuation model predictive control (CMPC) of a system determines at least a part of a preconditioner using an approximate coefficient function and determines a solution vector by solving a matrix equation of the CMPC with a coefficient matrix defined by an exact coefficient function at a current time step of a control using an iterative method with the preconditioner. The approximate coefficient function applied to a vector approximates a result of an application of the exact coefficient function to the vector. A control signal for controlling the system is generated using the solution vector.

20 Claims, 12 Drawing Sheets

METHOD AND APPARATUS FOR PRECONDITIONED CONTINUATION MODEL PREDICTIVE CONTROL

FIELD OF THE INVENTION

The invention relates generally to model predictive control, and more particularly to methods and apparatus for preconditioned continuation model predictive control of dynamical systems.

BACKGROUND OF THE INVENTION

Model predictive control (MPC) is used in many applications to control complex dynamical systems. Examples of such systems include production lines, car engines, robots, other numerically controlled machining, and power generators.

The MPC is based on an iterative, finite horizon optimization of a model of a system. The MPC has the ability to anticipate future events, and to take appropriate control actions. This is achieved by optimizing the operation of the system over a future finite time-horizon subject to constraints, and only implementing the control over a current time step.

The MPC can predict the change in dependent variables of the modeled system caused by changes in independent variables. In a chemical process, for example, independent variables that can be adjusted by the controller are often pressure, flow, temperature, opening of the valves, and stiffness of dampers. Independent variables that cannot be adjusted by the controller are treated as disturbances. Dependent variables in these processes are other measurements that represent either control objectives or process constraints.

The MPC uses models of the system, the current system measurements, the current dynamic state of the process, and the process variable targets and limits to calculate future changes in the dependent variables. These changes are calculated to hold the dependent variables close to target subject to constraints on both independent and dependent variables. The MPC typically sends out only the first change in each independent variable to be implemented, and repeats the calculation when the next change is required.

The MPC numerical methods are implemented on various computational apparatus often designed specifically for a given system. Computational apparatus can range from inexpensive fixed-point precision embedded controllers to sophisticated multi-core computer processor units (CPU), graphics processing unit (GPU), field-programmable gate array (FPGA), or dedicated parallel computer clusters.

Model predictive controllers rely on dynamic models of the process, most often linear empirical models, in which case the MPC is linear. Nonlinear MPC (NMPC), which describes systems with nonlinear models, is often more realistic, compared to the linear MPC, but computationally more difficult. Similar to the linear MPC, the NMPC requires solving optimal control problems on a finite prediction horizon, generally not convex, which poses challenges for obtaining a numerical solution. The numerical solution of the NMPC optimal control problems is usually based on Newton-type optimization schemes.

Exact Newton-type optimization schemes require an analytic expression of a corresponding Jacobian matrix, which is rarely available in practice and is commonly replaced with a forward difference (FD) approximation. Such approximate Newton-type optimization schemes utilize the FD) approximation of the original nonlinear equation during every time step of the control.

In and application to the NMPC, such the approximate Newton-type optimization can be performed by a Continuation NMPC (CNMPC) numerical method described by Ohtsuka, T., "A Continuation/GMRES Method for Fast Computation of Nonlinear Receding Horizon Control," Automatica, Vol. 40, No. 4, pp. 563-574, Apr. 2004, one of the key repetitive and most computationally intensive steps in on-line calculations with CNMPC is numerical solution of a matrix equation $Ax=b$, where A is a coefficient matrix, x is a solution vector and b is a vector. The solution varies, from one time step of control to the next one) the coefficient matrix A and the vector b.

The coefficient matrix A in the CNMPC is not explicitly given and available only via matrix-vector products. Specifically, a computer code is available to compute a product $A*X$, where A is the coefficient matrix, * is a matrix-matrix product, and X is a single column-vector, or several column-vectors assembled into a matrix. In this disclosure, the action of this computer code is referred as an application of "a coefficient function." The coefficient function applied to a vector returns a product of the coefficient matrix and the vector. Internally, the coefficient function requires, e.g., evaluation of the state and costate equations by solving a number of differential equations, as described by Ohtsuka.

Because the coefficient matrix A is only available via the coefficient function, rather than in the matrix format, direct matrix solvers, requiring access to matrix entries, are not used in the CNMPC. Instead, so-called "matrix-free" iterative methods are used, which can operate having only the coefficient function without the coefficient matrix A. One conventional matrix-free iterative method for solving the matrix equation $Ax=b$ of the CNMPC is a generalized minimal residual (GMRES) method. The use of GMRES for the FD approximation of the nonlinear equation during every time step is commonly called FDGMRES, and can be interpreted as inexact Newton's method. In the context of CNMPC, the FDGMRES is named Continuous/GMRES (C/GMRES).

The FDGMRES requires matrix-vector multiplications involving the coefficient function. The overall cost of computations is proportional to the maximal number of FDGMRES steps. Slow convergence of the FDGMRES results in slowing down on-line computations of the control and reducing control quality obtained in real time calculations in the controller.

Accordingly, it is desired to increase an efficiency of a continuation model predictive control of a system.

SUMMARY OF THE INVENTION

Model predictive control (MPC) is used in many applications. Nonlinear MPC (NMPC) controls systems with nonlinear models are often more realistic than linear MPC, but computationally more difficult. A Continuation NMPC (CNMPC) is a type of NMPC that determines a solution vector x of the control by repeatedly solving a matrix equation Ax-b with varying coefficient matrix A and the right-hand side vector b. For each time step of the control, the CNMPC generates, from the solution vector x, a control action to control a system.

Due to a potentially large matrix size, relative to the computational resources of the controller, and the fact that individual entries of the coefficient matrix A are not readily available, direct matrix-factorization based solvers for the matrix equation Ax=b are impractical. Thus, the CNMPC solves the matrix equation iteratively, e.g., using an iterative method with a preconditioner.

The preconditioned iterative method of the CNMPC requires matrix-vector multiplications involving the coefficient matrix A, and the overall cost of computations is proportional to the maximal number of iterations. Due to the complexity of computation of the coefficient matrix A, its varying nature, and the necessity of matrix-vector multiplications, the CNMPC conventionally does not use and does not even explicitly determine the coefficient matrix entry-wise.

Instead, the CNMPC relies on a coefficient function a( ) that when applied to a vector x returns a product of the coefficient matrix A and the vector x, i.e., $a(x)=A*x$. The coefficient function is generated for each time step of the control. Internally, generating the formulas of the coefficient function requires solving a number of differential equations.

Various embodiments of the invention are based on recognition that despite the complexity of computation of the coefficient matrix and the presence of the coefficient function, it can be beneficial to explicitly determine the coefficient matrix. This is because the coefficient matrix can be used to directly solve the matrix equation or to determine a preconditioner in the preconditioned iterative method to reduce a number of iterations. Because the computational complexity of the CNMPC is proportional to the maximal number of iterations, the preconditioner according to some embodiments reduce the complexity of the CNMPC.

Various embodiments of the invention are based on another recognition that, for the purpose of the preconditioning, each entry of the coefficient matrix needs to be determined using a coefficient function, but the coefficient function does not have to be exact, and can be an approximate coefficient function. Using the coefficient function, even in the approximate form, for determining each entry of the coefficient matrix, preserves a framework of the CNMPC for the entire coefficient matrix, and improves a quality of the coefficient matrix used to determine a preconditioner.

As used herein, the exact coefficient function is the coefficient function used by a controller to determine a solution vector of the control for a current time step of the control. Any other coefficient function is approximate. For example, the approximate coefficient function is a different exact coefficient function determined for a different time step of the control; or a coefficient function determined using an arithmetic having a precision lower than a precision of arithmetic for determining the exact coefficient function; or a coefficient function determined using a simplified solver for differential equations.

Some embodiments of the invention determine a coefficient matrix using one or combination of an approximate coefficient function and an exact coefficient function. Such flexibility in determining the individual entries of the coefficient matrix allows partitioning the determination of different entries of the coefficient matrix in time, in space and/or in quality. This is because the usage of one or combination of the approximate and the exact coefficient functions allows determining different entries of the same coefficient matrix at different time steps of the control, on different processors, and with different accuracy, while still preserving the framework of the CNMPC for determining the preconditioner.

For example, some embodiments determine a part of the coefficient matrix using the exact coefficient function, and determine another part of the coefficient matrix using the approximate coefficient function. For example, the coefficient matrix determined during a previous time step of the control, i.e., using the approximate coefficient function from a point of view of the current time step of the control, can be updated at the current time step using the exact or the approximate coefficient function.

For example, one embodiment reuses the preconditioner determined from the coefficient matrix for several subsequent times steps. This embodiment can monitor the preconditioner quality and recalculate the coefficient matrix and preconditioner when the quality drops. For example, the embodiment can update or recalculate the coefficient matrix when a rate of convergence of the preconditioned iterative method is less than a threshold.

Some embodiments are also based on realization that the coefficient matrix can be determined or updated asynchronously and concurrently with, e.g., in parallel to, the execution of the iterative solver for the matrix equation. For example, in one embodiment, the solving of the matrix equation is performed by a controller processor during a main control routine, and at least a part of the coefficient matrix is determined in parallel with the main control routine using an additional processor.

Some embodiments of the invention determine at least part of the coefficient matrix by applying the coefficient function to coordinate vectors of an identity matrix or to vectors of full-ranked matrix of a size of the coefficient matrix. Those embodiments can take advantage of a multi-thread computation using multiple processors, e.g., GPU or FPGA, because one application of the coefficient function to a vector is independent from another application. Thus, the embodiments can determine the elements of the coefficient matrix in parallel, which increase the computational efficiency.

Some embodiments determine the preconditioner using the coefficient matrix and use the preconditioner in solving the matrix equation. For example, the iterative solver can be stopped at some iterative step, and then restarted using the current iterative approximation to the solution as an initial approximation for the restarted method, with a newly determined or updated preconditioner. In this case, the preconditioner is fixed during the process of iterations between the restarts.

Alternatively, a different embodiment updates the preconditioner in the iterative solver without the restart of the solver, leading to a variable preconditioner that can change on every iteration. Thus, embodiments are modified to use flexible iterative methods that allow variable preconditioning.

Additionally or alternatively, one embodiment is based on realization that conventional C/GMRES, as it starts at the given time step, does not use any information, apart possibly from the initial approximation to the solution, from the previous time step(s). Since this information can accelerate the convergence, this embodiment utilizes a different, compared to conventional, framework, where an iterative solver for the matrix equation Ax=b, is not restarted between the time steps, but rather keeps running, only with the updated coefficient matrix A (given by the updated coefficient function) and the updated right-hand side vector b. This embodiment uses iterative methods that are flexible not only to variable preconditioning, but also to updated coefficient matrix A and the right-hand side vector b.

Some embodiments are based on another realization that the coefficient function is used by the iterative method for solving the equation matrix, resulting in a new pair of vectors x and $A*x$ on every iteration. These pairs are usually discarded, but some embodiments use that information for updating the coefficient matrix and the preconditioner.

Accordingly, one embodiment discloses a method for a continuation model predictive control (CMPC) of a system. The method includes determining at least a part of a preconditioner using an approximate coefficient function; determining a solution vector by solving a matrix equation of the CMPC with a coefficient matrix defined by an exact coefficient function at a current time step of a control using an iterative method with the preconditioner, wherein the approximate coefficient function applied to a vector approximates a result of an application of the exact coefficient function to the vector; and generating a control signal for controlling the system using the solution vector, wherein steps of the method are performed by at least one processor.

Another embodiment discloses a continuation model predictive controller (CMPC) for controlling a system according to a control signal generated at each time step. The controller includes a memory for storing a model of the system, an approximate coefficient function and an exact coefficient function, wherein the approximate coefficient functions applied to a vector returns a product of an approximate coefficient matrix and the vector, and wherein the exact coefficient functions applied to the vector returns a product of an exact coefficient matrix and the vector; and at least one processor for determining a preconditioner using the approximate coefficient function, for solving a matrix equation with a coefficient matrix defined by the exact coefficient function using an iterative method with the preconditioner to produce a solution vector, and for generating the control signal using the solution vector.

DETAILED DESCRIPTION OF THE PREFERRED EMBODIMENT

Some embodiments of the invention provide a system and a method for controlling an operation of a system or a system according to a model of the system, using model predictive control (MPC).

Figure 1:
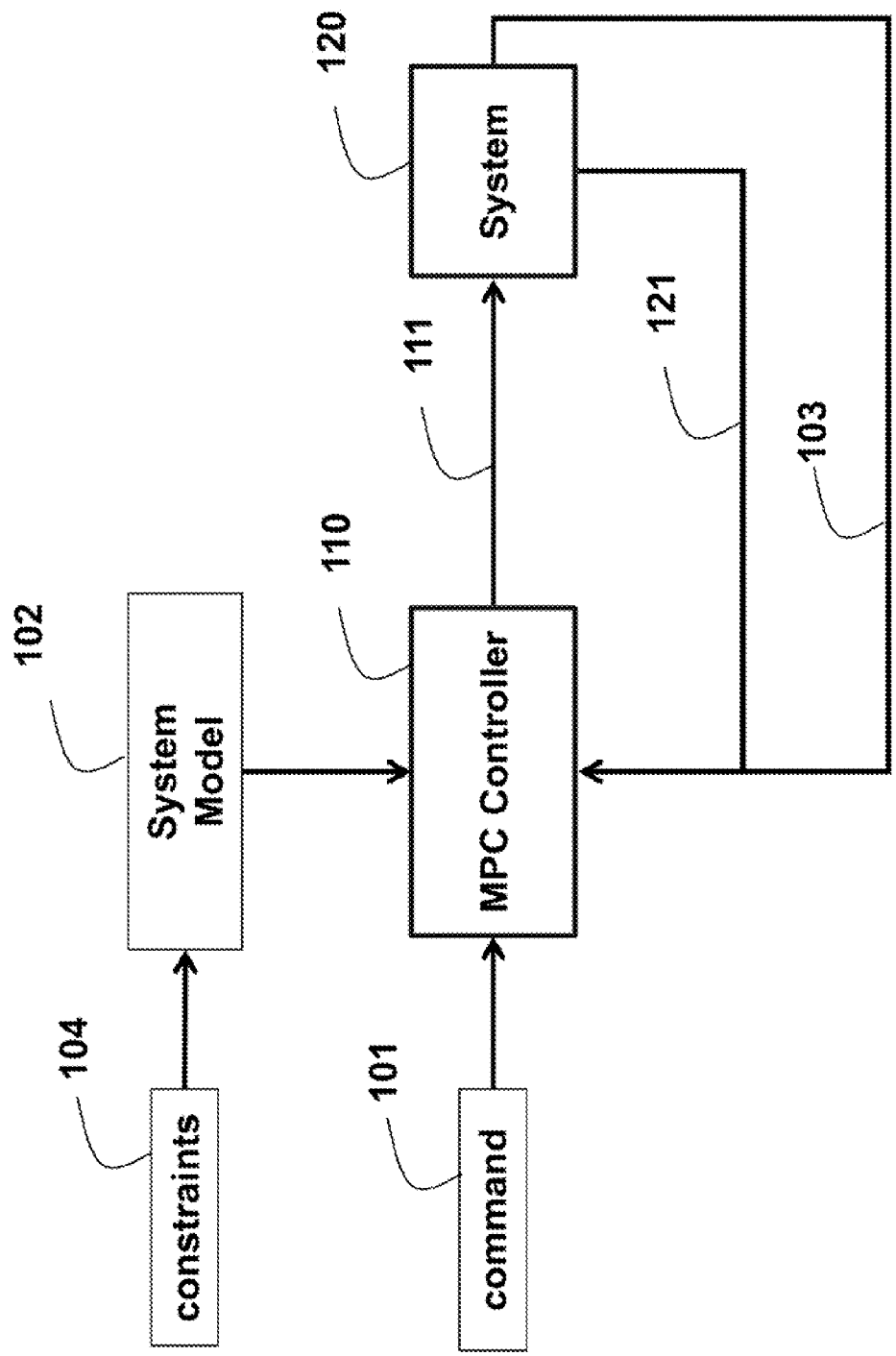
FIG. 1 is a block diagram of a controller and system according to embodiments of the invention.

FIG. 1 shows an example system 120 connected to an MPC controller 110. The controller 110 is programmed according to a model 102 of the system. The model can be a set of equations representing changes of the state 121 and output 103 of the system 120 over time as functions of current and previous inputs 111 and previous outputs 103. The model can include constraints 104 that represent physical and operational limitations of the system. During the operation, the controller receives a command 101 indicating the desired behavior of the system. The command can be, for example, a motion command. In response to receiving the command 101, the controller generates a control signal 111 that serves as an input for the system. In response to the input, the system updates the output 103 and the state 121 of the system.

The system, as referred herein, can be any machine or device controlled by certain manipulation input signals (inputs), possibly associated to physical quantities such as voltages, pressures, forces, and to return some controlled output signals (outputs), possibly associated to physical quantities such as currents, flows, velocities, positions. The output values are related in part to previous output values of the system, and in part to previous and current input values. The dependency of previous inputs and previous outputs is encoded in the state of the system. The operation of the system, e.g., a motion of components of the system, can include a sequence of output values generated by the system following the application of certain input values.

A model of the system can include a set of mathematical equations that describe how the system outputs change over time as functions of current and previous inputs, and the previous outputs. The state of the system is any set of information, in general time varying, for instance an appropriate subset of current and previous inputs and outputs, that, together with the model of the system and future inputs, can uniquely define the future motion of the system.

The system can be subject to physical and specification constraints limiting the range where the outputs, the inputs, and also possibly the states of the system are allowed to operate.

The controller can be implemented in a hardware or a software program executed in a processor, e.g., a microprocessor, which at fixed or variable control period sampling intervals receives the system outputs and the desired operation of the system motion, and determines, using these information, the inputs, e.g., the control signal 111, for operating the system.

Figure 2:
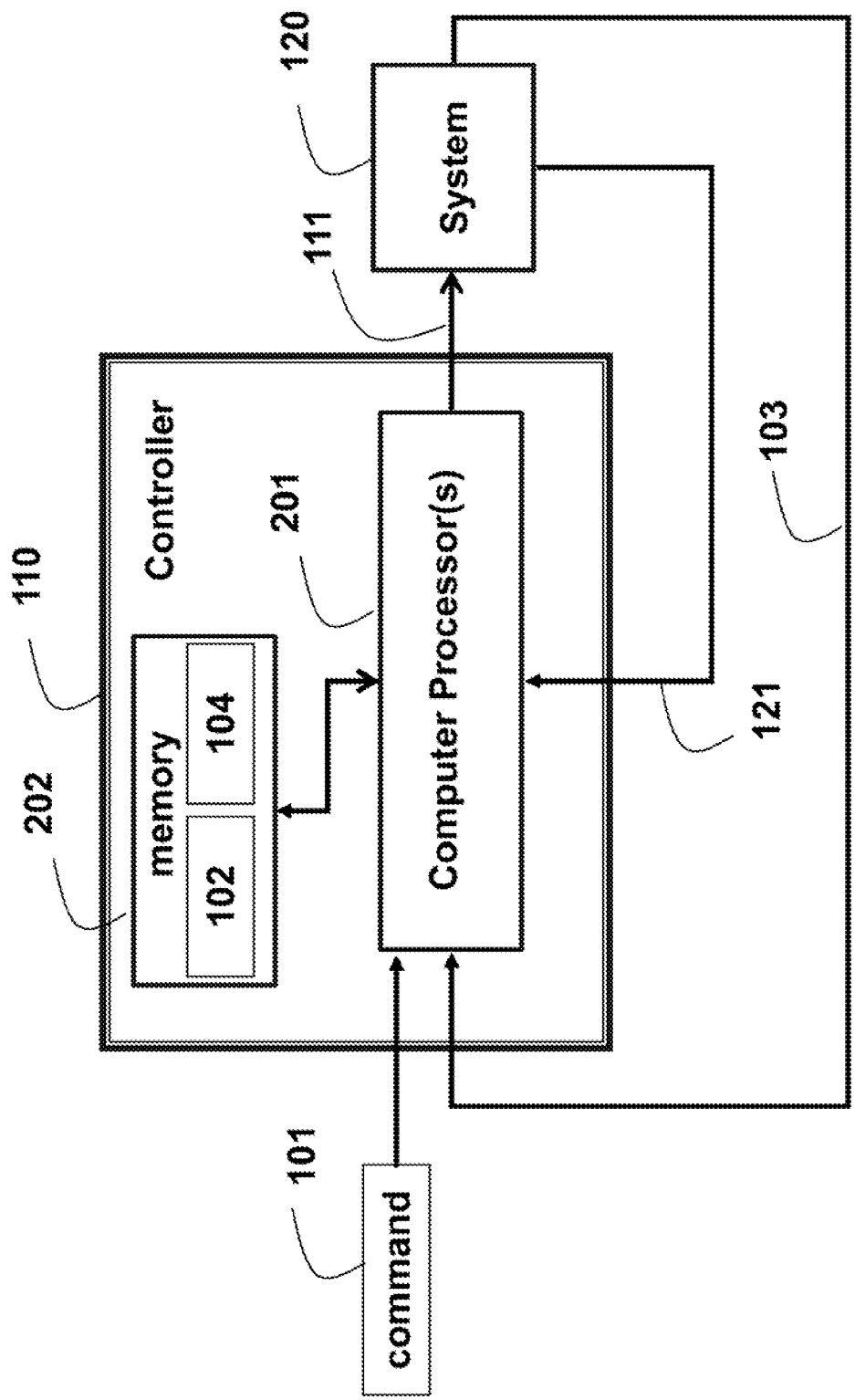
FIG. 2 is a block diagram of the controller according to embodiments of the invention.

FIG. 2 shows a block diagram of the controller 110 according to embodiments of the invention that actuates the system so that the state 121 of the system and output 103 follow a command 101. The controller 110 includes a single computer processor unit (CPU) or multiple CPUs 201 connected to a memory 202 for storing the model 102 and the constraints 104 on the operation of the system. The controller actuates the system so that the system output and the state follow command 101.

Some embodiments provide a system and a method for a continuation model predictive control (CMPC) of a system. The CMPC is a type of MPC that determines solution vector x of the control by repeatedly solving a matrix equation Ax=b of the CMPC, with varying coefficient matrix A and the vector b. At each time step, the CMPC generates, from the solution vector x, a control action to control a system. See Appendix A for mathematical details. Some embodiments use nonlinear MPC (NMPC), which describes systems with nonlinear models. In those embodiments, the CMPC is actually CNMPC.

Due to a potentially large matrix size, relative to the computational resources of the controller, and the fact that individual entries of the matrix A are not readily available, classical direct matrix-factorization based solvers for the matrix equation Ax=b are considered impractical. The CMPC thus involves solving the matrix equation iteratively, e.g., using a preconditioned iterative method, such as a preconditioned generalized minimal residual (GMRES) method.

Figure 3:
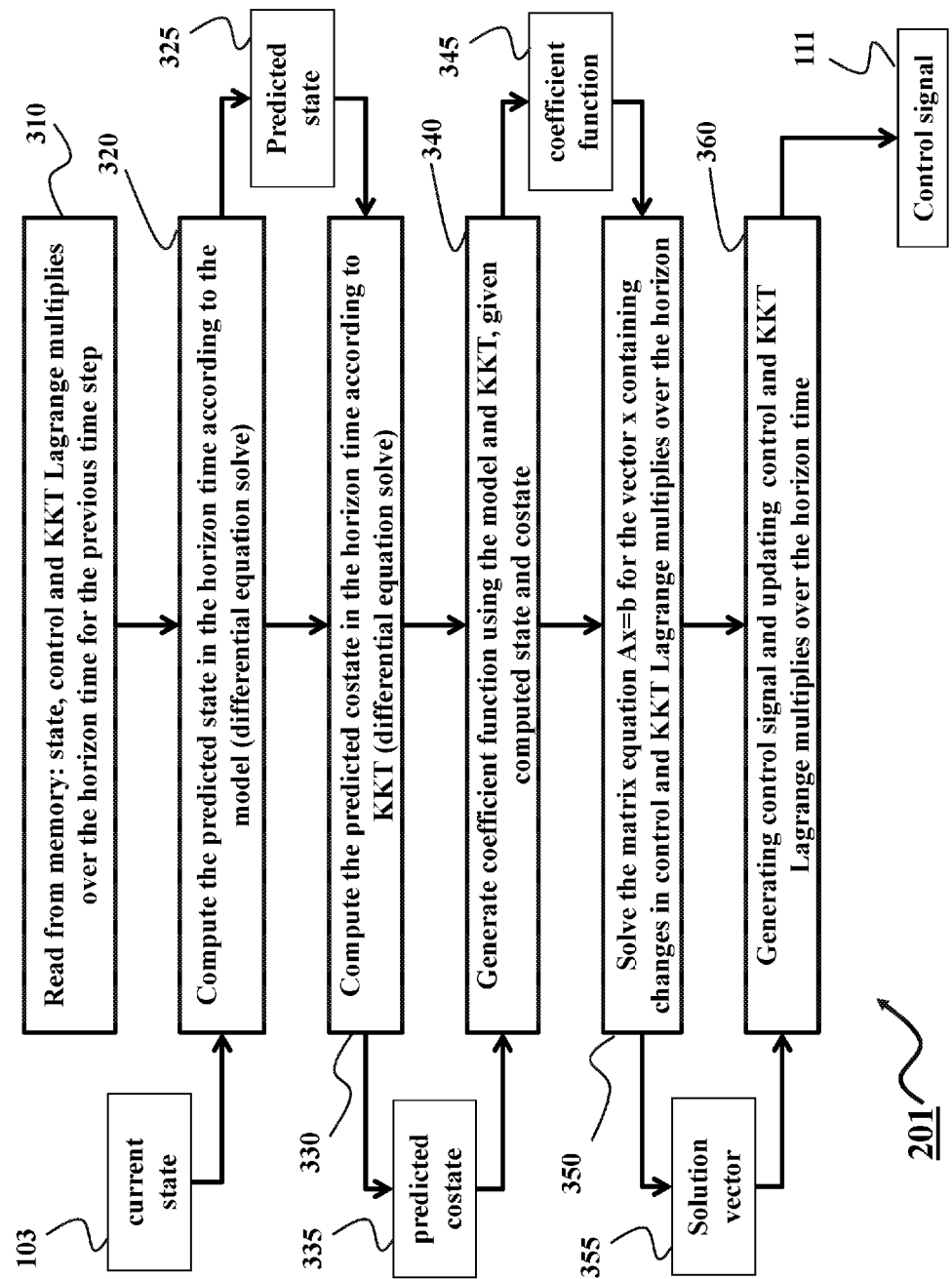
FIG. 3 is a block diagram of a nonlinear MPC method implemented on the controller according to embodiments of the invention.

FIG. 3 shows a block diagram of a method for a continuation model predictive control (CMPC) of a system according to some embodiments of the invention. The method can be executed by computer processor(s) 201 of the controller 110 and/or using additional processors operating concurrently with the processor of the controller. In this example the controller at a current time step t of a control is activated by the measured state 121. The model 102 of the system and constraints 104 are stored in the memory 202 of the controller.

The method in FIG. 3 executes an on-line control step generating a control signal 111 for controlling the system based on the measured values of the current state 103 and the values 310 of state, control, Lagrange multiplies determined over the horizon time for the previous time step of the control.

For example, the method determines 320 the predicted state 325 in the horizon time according to the model of the system by solving a differential equation using values 103 and 310, and determines 330, from the predicted state 325, a predicted costate 335 in the horizon time according to the Karush-Kuhn-Tucker (KKT) necessary optimality conditions.

The method generate 340 the coefficient function 345 using the model, the Lagrange multiplies, the state 325 and costate 335, and the values 310. The method solves 350, using the coefficient function 345, the matrix equation Ax=b for the vector x containing changes in the control signal and Lagrange multiplies over the horizon time to produce a solution vector 355 for the control signal 111. For the solution 350, the coefficient matrix A is implicitly given by the coefficient function 340. After the solution vector is determined, the method generates 360 the control signal 111 and updates the values of the state, the control and the Lagrange multiplies over the horizon time. The updated values are used by the method at the next time step of the control.

In some embodiments, the method determines 360 the control for the entire time interval over the horizon time, but outputs only the control signal 111 for the nearest time step as prescribed by the MPC.

Due to the complexity of computing of the coefficient matrix A, its varying nature, and the necessity of matrix-vector multiplications, the CMPC usually does not use and does not even explicitly determine the coefficient matrix A entry-wise. Instead, the CMPC relies on the coefficient function 345. The coefficient function a(x) 345 applied to a vector x returns a product of the coefficient matrix A and the vector x, i.e., a(x)=A*x. Internally, the generation 340 of the formulas of the coefficient function 345 requires solving differential equations for the state 325 and then for the costate 335. See Appendix A for mathematical details.

Various embodiments of the invention solve the matrix equation Ax=b, wherein the coefficient matrix A is defined by the coefficient function 345. Due to a potentially large matrix size, relative to the computational resources of the controller, and the fact that individual entries of the coefficient matrix A are not readily available, classical direct matrix-factorization based solvers for the matrix equation Ax=b are considered impractical. Accordingly, some embodiments of the invention solve the matrix equation of CMPC using an iterative method with a preconditioner.

Some embodiments of the invention are based on recognition that despite the complexity of computation of the coefficient matrix and the presence of the coefficient function, it can be beneficial to explicitly determine the coefficient matrix itself. This is because the coefficient matrix can be used to directly solve the matrix equation or to determine a preconditioner in the preconditioned iterative method to reduce a number of iterations. Because the computational cost of CMPC is proportional to the maximal number of iterations, the usage of the preconditioner determined based on the coefficient function can reduce the cost of the CMPC.

Some embodiments of the invention are based on another recognition that, for the purpose of the preconditioning, each entry of the coefficient matrix needs to be determined using a coefficient function, but the coefficient function does not have to be exact, and can be an approximate coefficient function. Using a coefficient function, even in the approximate form, for determining each entry of the coefficient matrix preserves a framework of the CMPC across the entire coefficient matrix and approves a quality of the coefficient matrix used to determine a preconditioner. Additionally or alternatively, the approximate coefficient function can be used to determine the preconditioner even without explicitly determining the entries of the coefficient matrix.

Figure 4A:
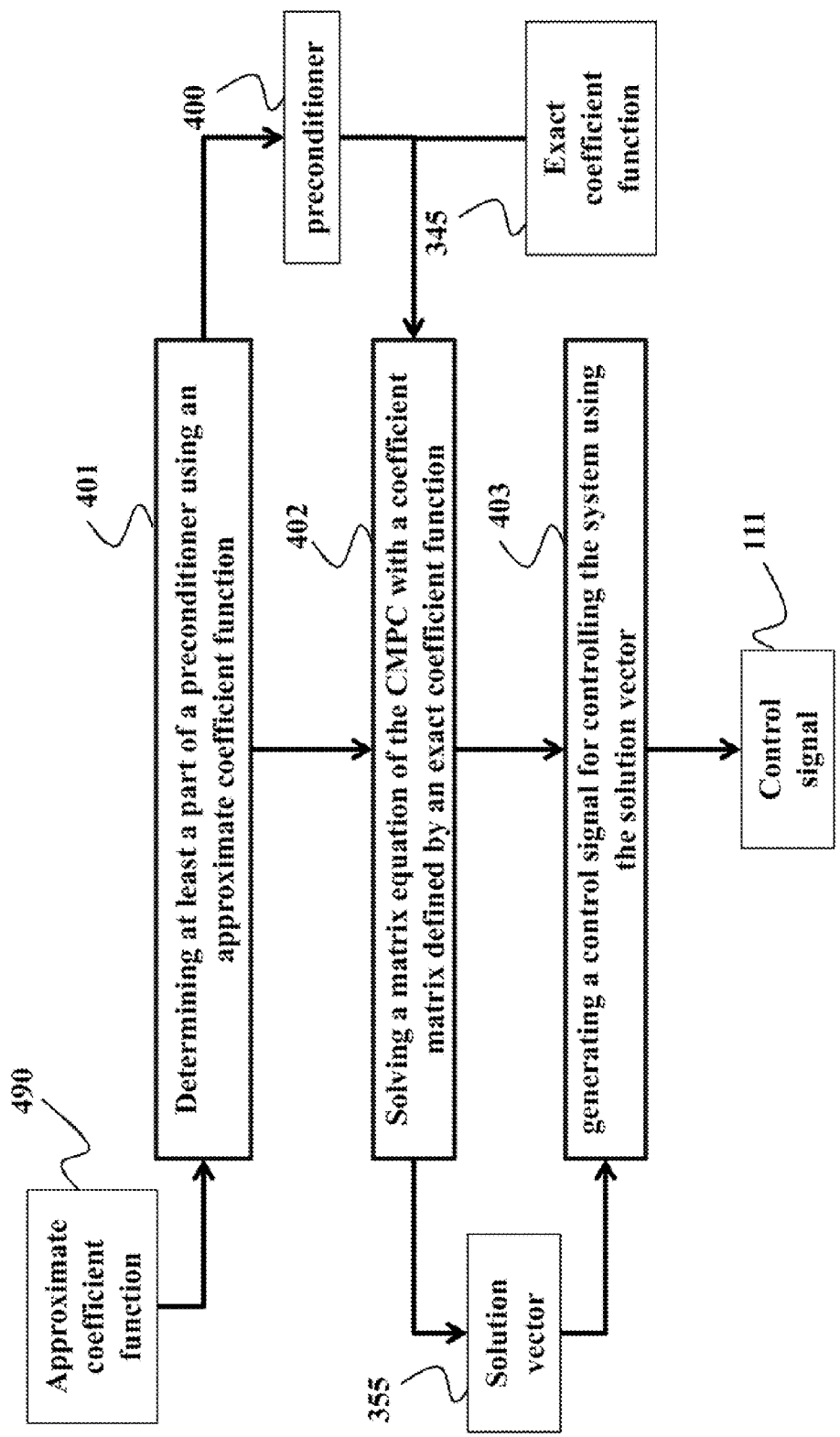
FIG. 4A is a block diagram of a method for a continuation model predictive control (CMPC) of a system according to one embodiment of the invention.

FIG. 4A shows a block diagram of a method for a continuation model predictive control (CMPC) of a system according to one embodiment of the invention. The embodiment determines 401 at least a part of a preconditioner 400 using an approximate coefficient function 490, and determines 402 a solution vector 355 by solving a matrix equation of the CMPC with a coefficient matrix defined by an exact coefficient function 345 at a current time step of a control using an iterative method with the preconditioner. The embodiment generates 403 a control signal 111 for controlling the system using the solution vector 355.

As used herein, the exact coefficient function is the coefficient function used by a controller to determine a solution vector of the control at a current time step of the control. Any other coefficient function is approximate. For example, the approximate coefficient function is a different exact coefficient function determined for a different time step of the control; or a coefficient function determined using an arithmetic having a precision lower than a precision of arithmetic for determining the exact coefficient function; or a coefficient function determined using a simplified solver for differential equations.

Notably, the approximate coefficient function applied to a vector approximates a result of application of the exact coefficient function to the vector. Specifically, the approximate coefficient functions applied to a vector returns a product of an approximate coefficient matrix and the vector, wherein the exact coefficient functions applied to the vector returns a product of an exact coefficient matrix and the vector for the current time step of the control.

Determining at least part of the preconditioner using the approximate coefficient function provides flexibility in determining the individual entries of the coefficient matrix and/or preconditioner and allows partitioning the determination of different parts of the preconditioner in space, in time and/or in quality. This is because the usage of one or combination of the approximate and the exact coefficient functions allows determining different entries of the same coefficient matrix at different time steps of the control, on different processors, and with different accuracy, while still preserving the framework of the CMPC for determining the preconditioner.

Figure 4B:
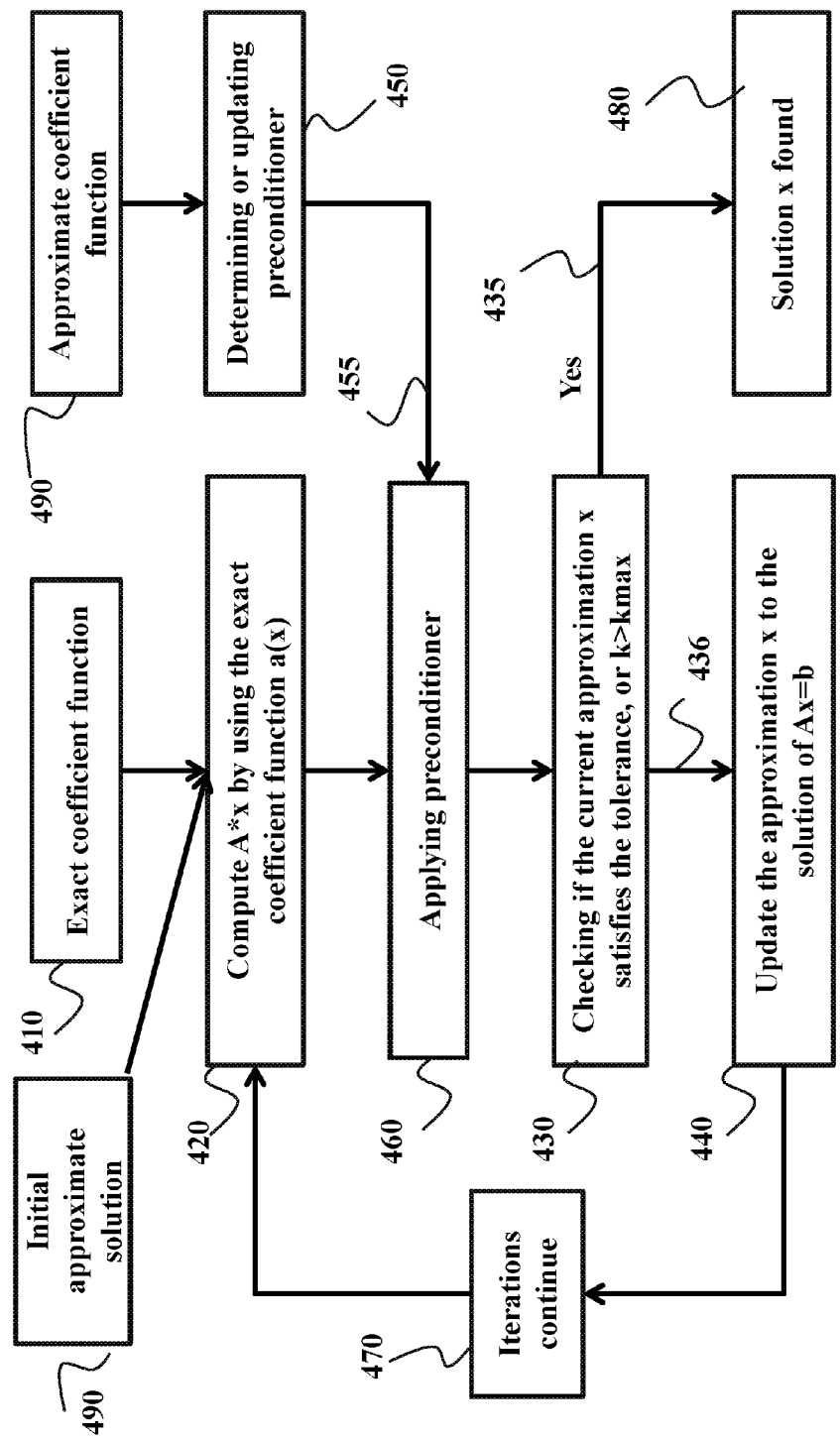
FIG. 4B is an example of a preconditioned iterative solver for the matrix equation according to some embodiments of the invention.

FIG. 4B shows an example of a preconditioned iterative method for solving the matrix equation Ax=b of the CMPC with a coefficient matrix defined by an exact coefficient function 410 according to one embodiment of the invention. An example of the iterative method is a preconditioned generalized minimal residual (GMRES) method.

The exact coefficient function 410 is determined for each current time step of the control. Also, an initial approximation of a solution vector x is determined. For example, a zero vector or a solution vector determined at the previous time step of the control are some possible choices.

The iterative method of the CMPC requires matrix-vector multiplications 420 involving the exact coefficient function a( ) on every iteration, and the overall cost of computations is proportional to the maximal number of iterations. A stopping criterion 430 checks if the current approximation x satisfies a given tolerance, or the maximum number of iterative steps $k_{max}$ is reached. If the stopping criterion is met 435, the iterations are stopped, outputting the current approximation to the vector x as an approximate solution 480 of the matrix equation Ax=b. If the stopping criterion is not met 436, an updated approximation 440 to the solution is computed and the iterations continue with a cycle to step 420, increasing 470 by one the iteration index k.

Some embodiments determine 450 at least a part of a preconditioner 455 using an approximate coefficient function 490. The preconditioner can first be generated and then applied, e.g., on every step of the main iterative cycle. In some embodiments, the preconditioner is a preconditioning function to, generated 450 outside of the main iterative cycle, wherein the preconditioning function t(x)=T*x applied to a vector returns a product T*x of a matrix form T of a preconditioner on the vector x.

The preconditioner T can be applied 460, e.g., during every step of the main iterative cycle. The preconditioner application 460 can for example mean that the preconditioner function t( ) acts on the residual b−Ax, i.e., determines t(b−Ax)=T*x. Application of the preconditioning accelerates the convergence of the iterative method without significantly increasing the computational costs per iteration, thus, leading to an overall improved performance of the controller.

If an approximate inverse of an approximate coefficient matrix A is used for the matrix form T of the preconditioner, i.e., T=A$^{-1}$, the number of iterations in the preconditioned iterative method is radically reduced. In an exact case, where the preconditioner T at a given time step coincides with the inverse of coefficient matrix, i.e., T=A$^{-1}$, the number of iterations in the preconditioned method is reduced to one. However, the exact case can be computationally expensive, thus, some embodiments of the invention are based on a recognition that, for the purpose of the preconditioning update or setup 450 and application 460, an approximate coefficient matrix and/or the approximate coefficient function 490 can be easier and faster to generate and apply, compared to their exact counterparts, while still can lead to high-quality preconditioning.

For example, one embodiment determines the approximate coefficient function using an arithmetic having a precision lower than a precision of an arithmetic for determining the exact coefficient function. This embodiment is based on realization that constructing and updating the coefficient matrix A for the purpose of determining the preconditioner T does not require full accuracy and can be done using a reduced number of arithmetic bits on the computer-based controller. Additionally or alternatively, another embodiment is determining the preconditioner T in the low precision arithmetic from the already computed approximate coefficient matrix function or the approximate coefficient matrix.

For example, in a mixed-type computing environment, having a conventional computer processing unit (CPU) with double arithmetic precision and a GPU with a single arithmetic precision, the calculation of the control can be performed on the CPU in double precision, while the preconditioner update or setup 450 can be performed on the GPU in single precision, including parallel calculation of the approximate coefficient matrix A, described in details below.

Additionally or alternatively, another embodiment determines the approximate coefficient function using a simplified solver for differential equations, wherein the simplified solver is faster, but less accurate than a solver for determining the exact coefficient function. For example, a solver for solving the differential equations in steps 320 and 330 can use a larger size, compared to the initial, grid, possibly non-uniform, in the time and/or space domain of the solver for determining the approximate coefficient function. This can increase the speed of on-line computations, while the resulting reduced accuracy only affects the preconditioner update or setup 450, not the accuracy of the actually computed solution 480 and the control signal 111.

Additionally or alternatively, another embodiment determines the approximate coefficient function 490 for the preconditioner update or setup 450 using a simplified approximate model 102 of the system. This embodiment approximates the model of the system used for determining the exact coefficient function and determines the approximate coefficient function using the approximate model of the system. Examples of such model approximation and/or simplification include, but are not limited to, one or a combination of linearizing the NMPC, using smaller than the original horizon time, and simplifying the constraints.

Some embodiments are based on another realization that the coefficient function a( ) and thus the coefficient matrix A can change at every time step, but the change is often moderate, because the consecutive optimal control problems in NMPC can be similar to each other.

Figure 5:
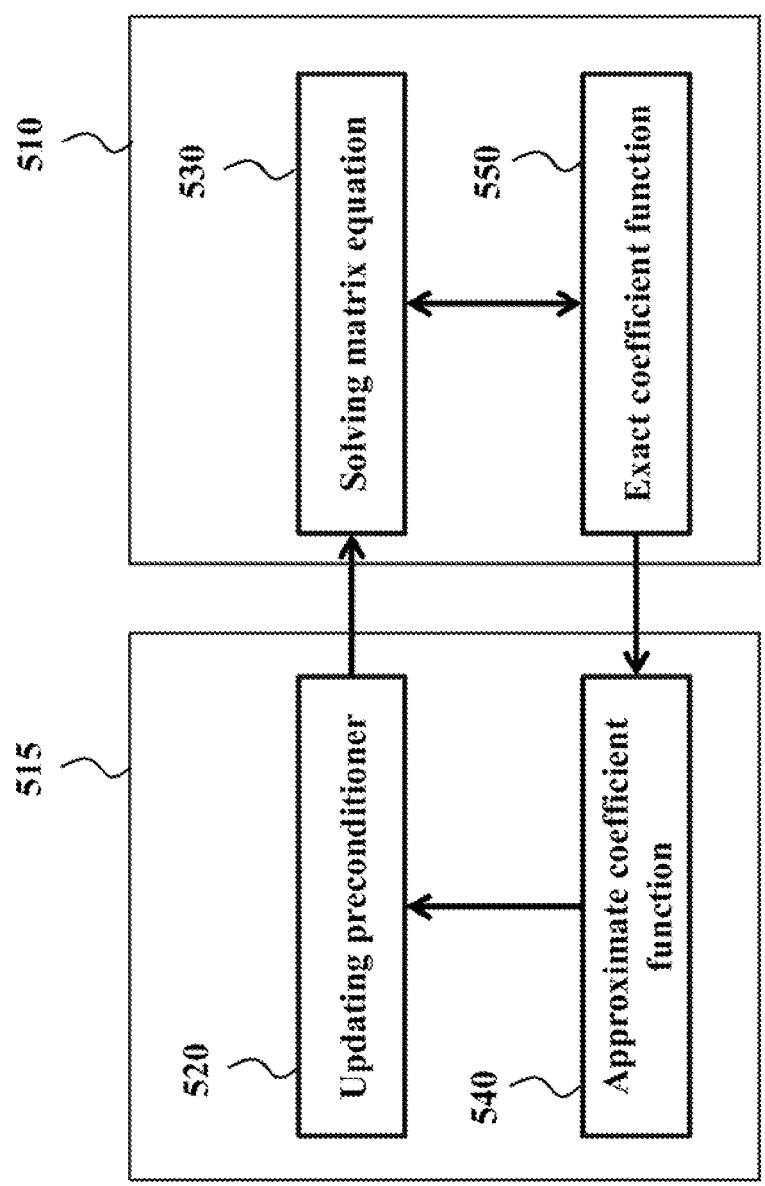
FIG. 5 is a block diagram of an asynchronous concurrent preconditioner setup according to some embodiments of the invention.

FIG. 5 shows a block diagram of a method for updating previously determined preconditioner according to some embodiments of invention. For example, the coefficient function used for solving 530 the matrix equation is the exact coefficient function 550. However, in the next time step of control, the exact coefficient function becomes the approximate coefficient function 540 and can be used for updating 540 the preconditioner. In some embodiments, the update 520 is done asynchronously, e.g., in parallel, with the solving 530. For example, if the solving is performed by a processor 510, the update 520 is performed by one or multiple different processors 515.

In some embodiments, the approximate coefficient function 540 updates 520 only a part of the preconditioner. The update is performed repeatedly at different time steps of control. Thus, this embodiment determines the preconditioner using multiple approximate coefficient functions. Such update allows to partition the determination of preconditioner in time, by using different coefficient function determine at different times, and in space, by updating same or different parts of the preconditioner using additional processors.

Some embodiments determine the preconditioner based on a coefficient matrix determined using one or combination of the approximate and exact coefficient functions. For example, if the coefficient matrix is determined exactly on every time step to set up the preconditioner, the number of iterations in the preconditioned iterative method can be reduced to one. When the coefficient matrix is only approximate for the purpose of the preconditioner setup, the number of iterations can be greater than one, but still may be smaller as compared with the conventional case without preconditioning. Accordingly, some embodiments provide a trade-off between the cost of calculations of the exact version of the coefficient function for the purpose of determining the preconditioner and the reduction of the number of iterations in the preconditioned iterative method.

For example, one embodiment reuses the preconditioner, determined from the exact coefficient matrix A for a previous time step, for several subsequent time steps. At these subsequent time steps the exact coefficient matrix A may change, so the preconditioner becomes determined from the approximation to the current exact coefficient matrix A. This embodiment can monitor the preconditioner quality and recalculate the preconditioner T when its quality drops. For example, the embodiment can recalculate the preconditioner T when a rate of convergence of the preconditioned iterative method is below a threshold.

Alternatively, one embodiment reuses for several subsequent time steps the preconditioner T, determined from the coefficient matrix computed for a predicted future state a few time steps ahead of the current time. This embodiment is based on a realization that the MPC process calculates controls and predicted future states within the horizon time. The MPC outputs only the next time step control to the system, discarding all other calculated quantities, but they can be used for the determining the preconditioner.

Other embodiments are based on realization that the preconditioner T can be determined or updated asynchronously and concurrently with (i.e., in parallel to) the execution of the iterative solver for Ax=b, for example on an additional CPU or GPU.

Some embodiments stop the iterative method to update the preconditioner. For example, the iterative method can be stopped at some iterative step, and then restarted using the current iterative approximation to the solution as an initial approximation for the restarted method, with a newly recalculated or updated preconditioner. In this case, the preconditioner is fixed during the process of iterations between the restarts.

Alternative embodiment uses the recalculated or updated preconditioner in an iterative solver without the restart, leading to a variable preconditioner, i.e., the preconditioner that may change on every iteration. Thus, embodiments are modified to use flexible iterative methods that allow variable preconditioning, such as flexible generalized minimum residual (PGMRES), preconditioned minimal residual (PMINRES), or preconditioned conjugate gradient (PCG) methods.

Additionally or alternatively, one embodiment is based on recognition that usually the iterative methods that start at the given time step, does not use any information, apart possibly from the initial approximation to the solution, from the previous time step(s). Because this information may be valuable to accelerate the convergence, this embodiment does not restart the iterative method between the time steps, but rather keeps running the iterations with the updated coefficient matrix A (given by the updated coefficient function) and the updated vector b. This embodiment uses iterative methods that are flexible not only to variable preconditioning, but also to updated coefficient matrix A and the vector b.

Some embodiments of the invention determine the preconditioner directly from the entries of the system coefficient matrix A stored in controller memory. Because the entries of the coefficient matrix A are not originally explicitly available, some embodiments determine each entry of the approximate or exact coefficient matrix. For example, one embodiment determines each entry of an approximate coefficient matrix using one or combination of the approximate coefficient function and the exact coefficient function, and determines the preconditioner using the approximate coefficient matrix.

Figure 6:
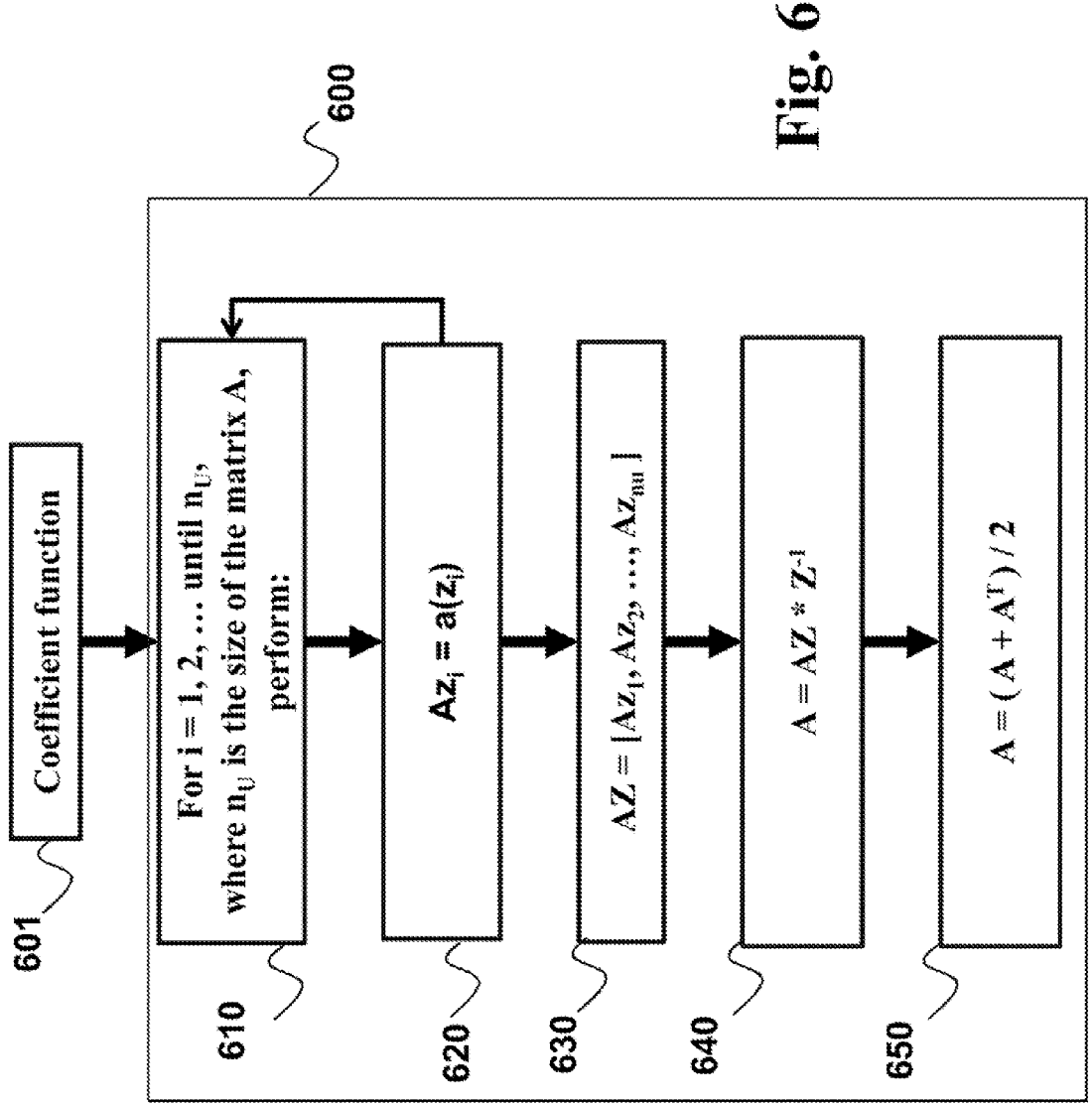
FIG. 6 is a diagram of an embodiment of the invention that determines the coefficient matrix by applying the coefficient function to vectors concurrently according to an embodiment of the invention.

FIG. 6 shows a flow chart of an embodiment of the invention that determines 600 the coefficient matrix by applying the coefficient function a( ) 601 to coordinate vectors $e_i$, i.e., the columns of the identity matrix 1, or to columns $z_i$ of any full-rank matrix Z of a size of the coefficient matrix A. The coefficient function 601 is the exact or the approximate coefficient function.

For example, some embodiments concurrently 610 apply 620 the coefficient function 601 to each of the vectors $z_i$ to obtain a matrix AZ 630. The embodiments determine 640 the coefficient matrix A, either exact or approximate, by multiplying the matrix AZ with the inverse of the matrix Z on the right. In some variations, the matrix Z is the identity, Z=1. In those variations the multiplication 640 is not needed.

If the coefficient matrix A is properly formulated, then the coefficient matrix is symmetric. Thus, some embodiment determine only the upper or lower triangular part of the coefficient matrix A. In some of the embodiments, nevertheless, the complete coefficient matrix A is computed for convenience or speed.

In some implementations of the controller, the computed complete coefficient matrix A may not be exactly symmetric, which can lead to numerical inaccuracies in preconditioning and the iterative method. Hence, one embodiment makes the coefficient matrix exactly symmetric by replacing 650 the coefficient matrix with its symmetric average $(A+A^T)/2$. Because the computations 620 in the loop 610 are entirely independent from each other, this embodiment can take advantage of multi-thread (parallel) computations using multiple processors, e.g., GPU or FPGA. Thus, the embodiment can determine the elements of the coefficient matrix in parallel, which increases the computational efficiency.

Figure 7:
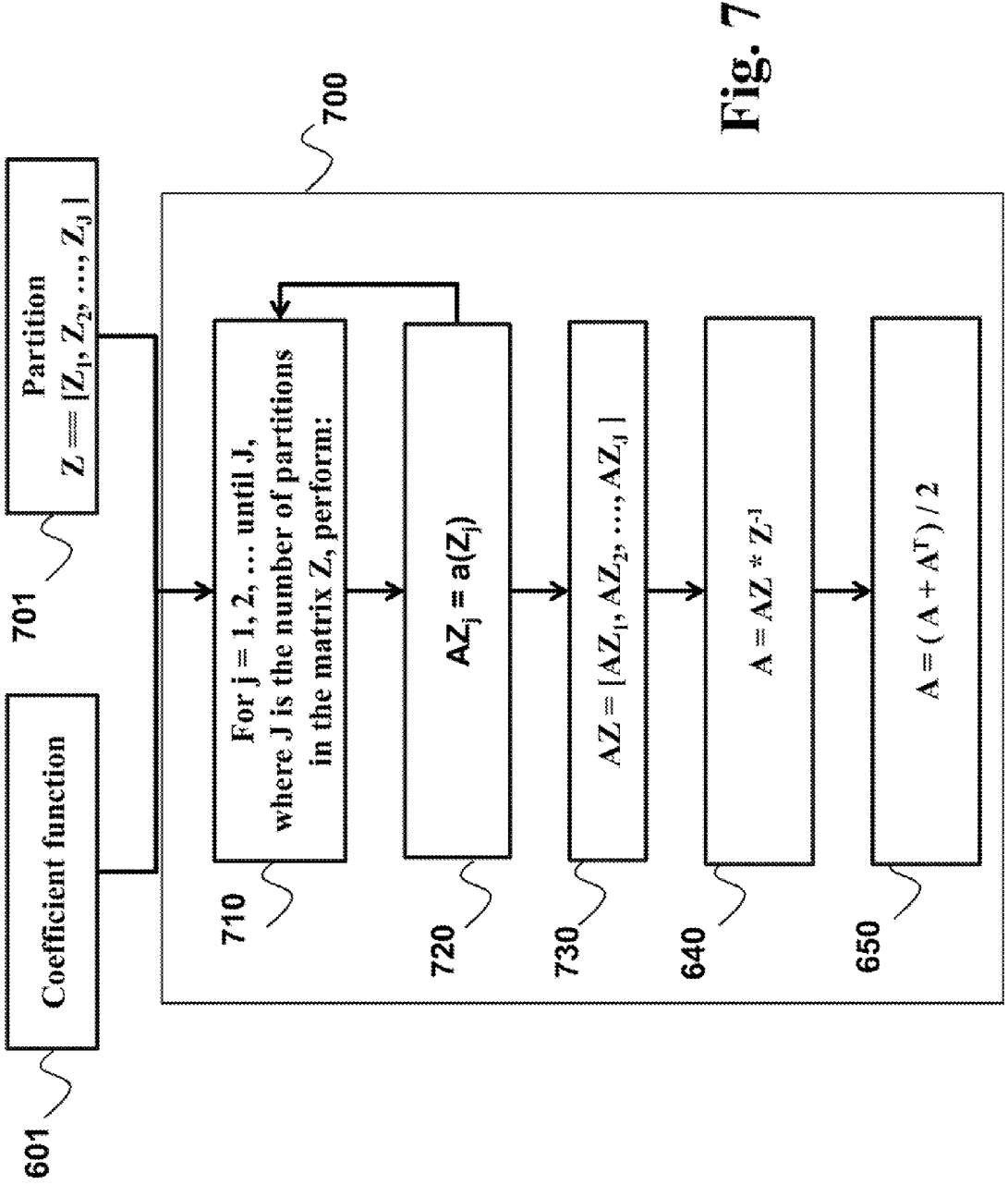
FIG. 7 is a diagram of another embodiment applying the coefficient function to blocks of vectors.

FIG. 7 shows a flow chart of an embodiment of the invention that determines 700 the coefficient matrix by applying the coefficient function $a(Z_j)$ to a block of vectors Z, rather than to a single vector a(z), on the same processor. The matrix Z, used here to generate the coefficient matrix A from the coefficient function 601, needs to be a priori partitioned 701 into blocks of its columns $Z_j$. If every block includes only a single column, the embodiment of FIG. 7 is similar to the embodiment of FIG. 6. Otherwise, the steps 710, 720, and 730 generalize the steps 610, 620, and 630.

Applying the coefficient function to a block of vectors on the same processor allows one embodiment to utilize high level Basic Linear Algebra Subprograms (BLAS), or their similar alternatives. BLAS are a set of low-level kernel subroutines that perform common linear algebra operations with vectors and matrices. High level BLAS, i.e., BLAS level 2 and 3, are especially intended to improve performance of programs using BLAS on vector processors with data and instruction pipelining, internal multi-threading using several functional units, and multi-level internal cache memory. In some embodiments, partitioning of the matrix Z into blocks can be optimized for the given controller computer hardware to balance, on the one hand, an opportunity for multi-thread computations using multiple processors and, on the other hand, the capability of a vector processor to hand multiple data and instructions.

Some embodiments are based on another realization that the exact coefficient function is applied on every step of the iterative method to different vectors is part of the main solving routing, resulting in a new pair of vectors x and A*x on every iteration. These pairs are not used further by the iterative method, but can provide information about the exact coefficient matrix A that can help reconstructing the approximate coefficient matrix A for the purpose of setting up the preconditioner. Accordingly, some embodiments update at least part of the preconditioner using results of application of the exact coefficient function to at least some of iterative vectors of the iterative method.

Figure 8:
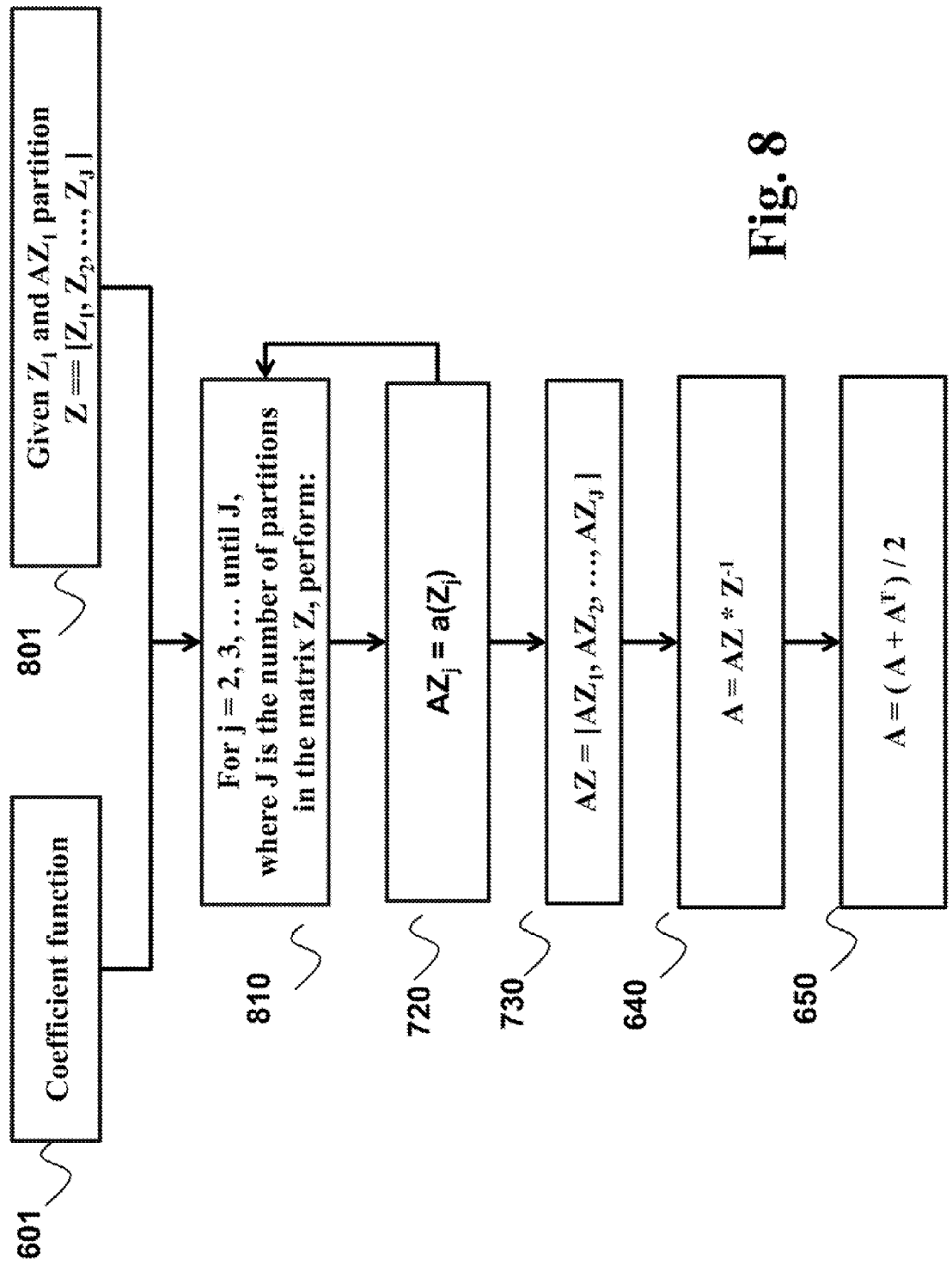
FIG. 8 is a block diagram of an embodiment that completes the already stored set of vectors to the full basis, and evaluates the coefficient function on this completion.

FIG. 8 shows an example of updating the coefficient matrix A from the given blocks of vectors $Z_1$ and $AZ_1$ according to one embodiment. First, the embodiment completes 801 the matrix $Z_1$ in any way to a full rank matrix Z and partition the complement, e.g., in a way similar to step 701 in FIG. 7. Because the product $AZ_1$ is already computed in previous iteration, the embodiment executes the loop 810 starting with the value j=2. The other steps of the method are similar to the steps of the embodiment in FIG. 7. Thus, this embodiment completes the already stored set of vectors to the full basis, and evaluates the coefficient function on this completion only, to obtain enough information to reconstruct the coefficient matrix A.

Figure 9:
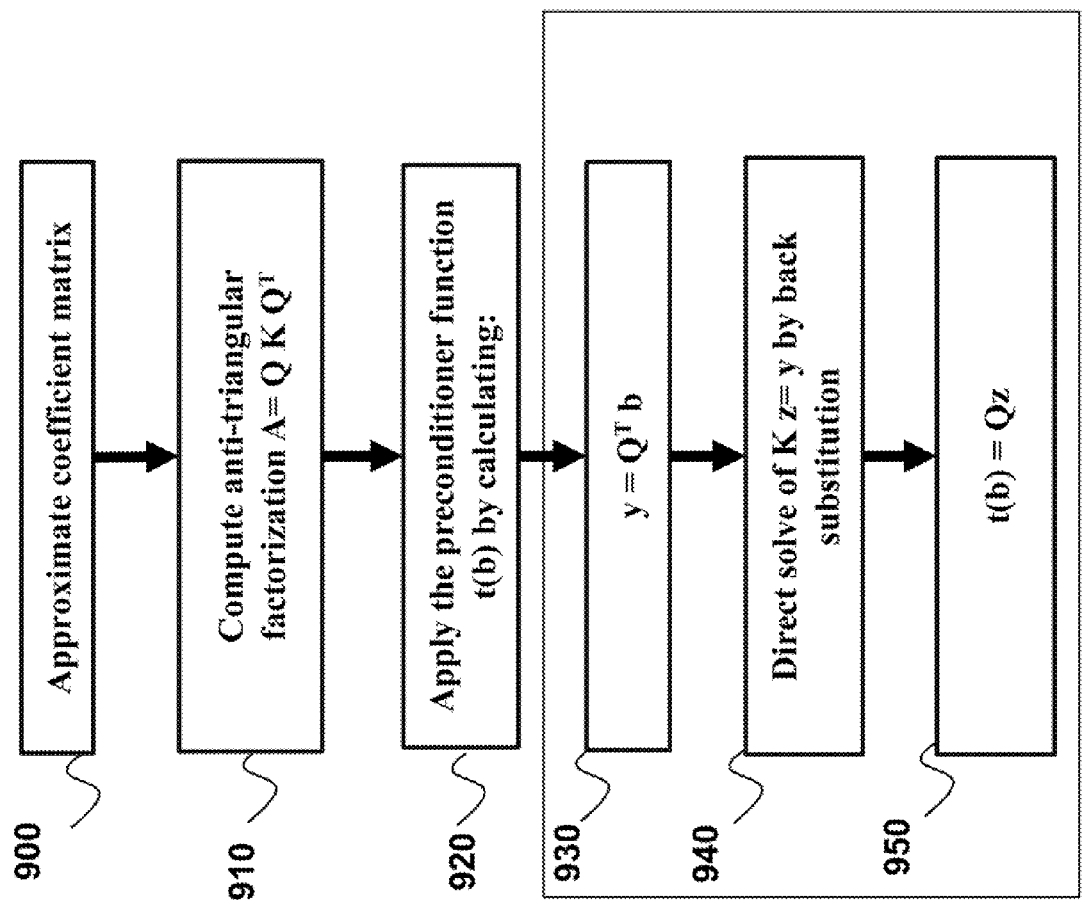
FIG. 9 is a diagram of an anti-triangular decomposition/factorization for determining a preconditioner according to an embodiment of the invention.
Figure 10:
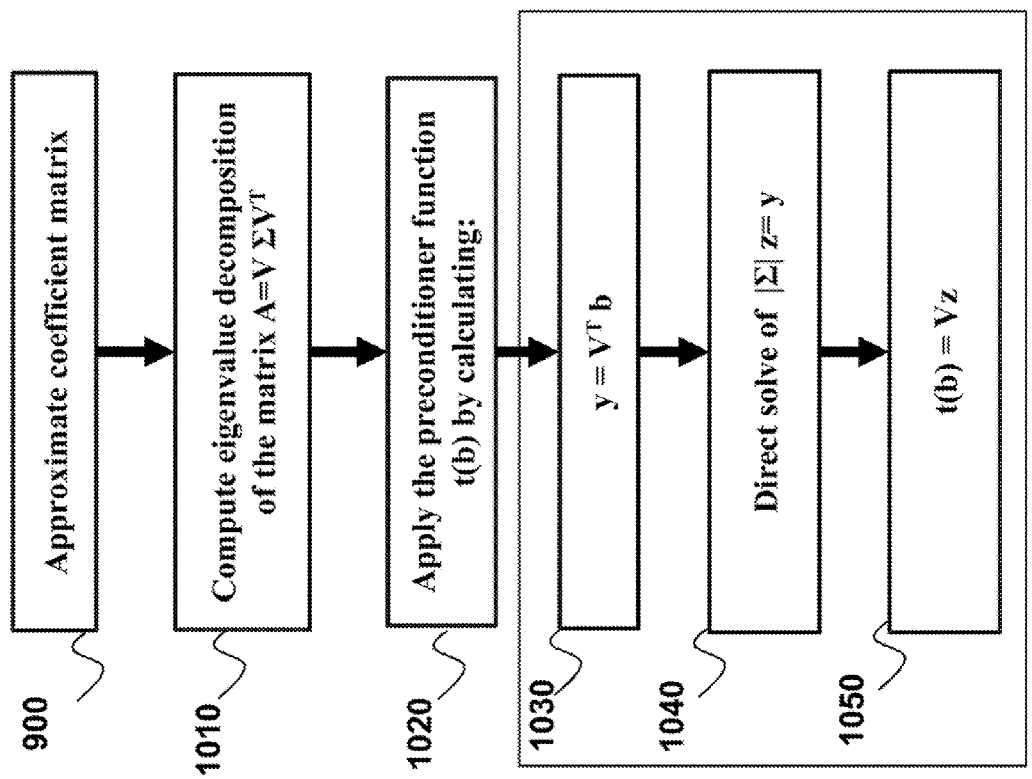
FIG. 10 is a diagram of another embodiment using eigenvalue decomposition of the coefficient matrix A to determine the preconditioner.

Having access to the entries of the coefficient matrix A allows determining a preconditioning function t( ) that simulates an inverse to the matrix coefficient function a( ). FIGS. 9 and 10 show diagram of exemplar embodiments that specify constructions and updates of the preconditioner T based on various matrix factorizations and eigenvalue or singular value decompositions of the coefficient matrix.

FIG. 9 shows a diagram of an anti-triangular decomposition $A=Q\ K\ Q^T$ that uses orthogonal transformations Q and take advantage of the symmetry of the matrix A by selecting a symmetric anti-triangular matrix K, where T is a transpose operation. The approximate coefficient matrix A 900 is predetermined and stored in the memory. The preconditioner setup 910 determines the anti-triangular factorization $A=Q\ K\ Q^T$, where the matrix Q is orthogonal and the matrix K is symmetric anti-triangular. The preconditioner function application t(b) 920 includes the following steps. The inverse of the matrix Q is applied 930 to the right side of the matrix equation b as $y=Q^T\ b$. The matrix equation K z=y is solved 940 by back substitution using the fact that the matrix K is anti-triangular. Finally, the preconditioner is determined 950 as t(b)=Q z.

This anti-triangular decomposition-based preconditioning results in a symmetric preconditioner $T=A^{-1}$ that is not positive definite, if the matrix A is not positive definite, which is taken into account in selecting a proper iterative solver, for example, preconditioned GMRES.

FIG. 10 shows a block diagram of another embodiment that can be used in addition or in alternative to on the embodiment of FIG. 9. In this embodiment, the preconditioner setup 1010 determines the eigenvalue decomposition of the matrix $A=V\ \Sigma V^T$, where V is an orthogonal matrix of the column eigenvectors, $\Sigma$ is a diagonal matrix made of eigenvalues, and the operation $^T$ denotes the matrix transpose. The eigenvalue decomposition is used 1020 to construct symmetric positive definite Absolute Value Preconditioner (AVP) given by $T=V|\Sigma|^{-1}\ V^T$, as shown in steps 1030, 1040, and 1050. In the direct solver 1040, the embodiment inverts the absolute values of the diagonal entries of the diagonal matrix E.

The advantage of the symmetric positive definite AVP T is that it allows the use of the preconditioned MINRES iterative method to solve the matrix equation Ax=b. MINRES may converge more reliably and faster compared to preconditioned GMRES, thus leading to reliable controllers with high clock rates capable of controlling fast changing systems.

Figure 11:
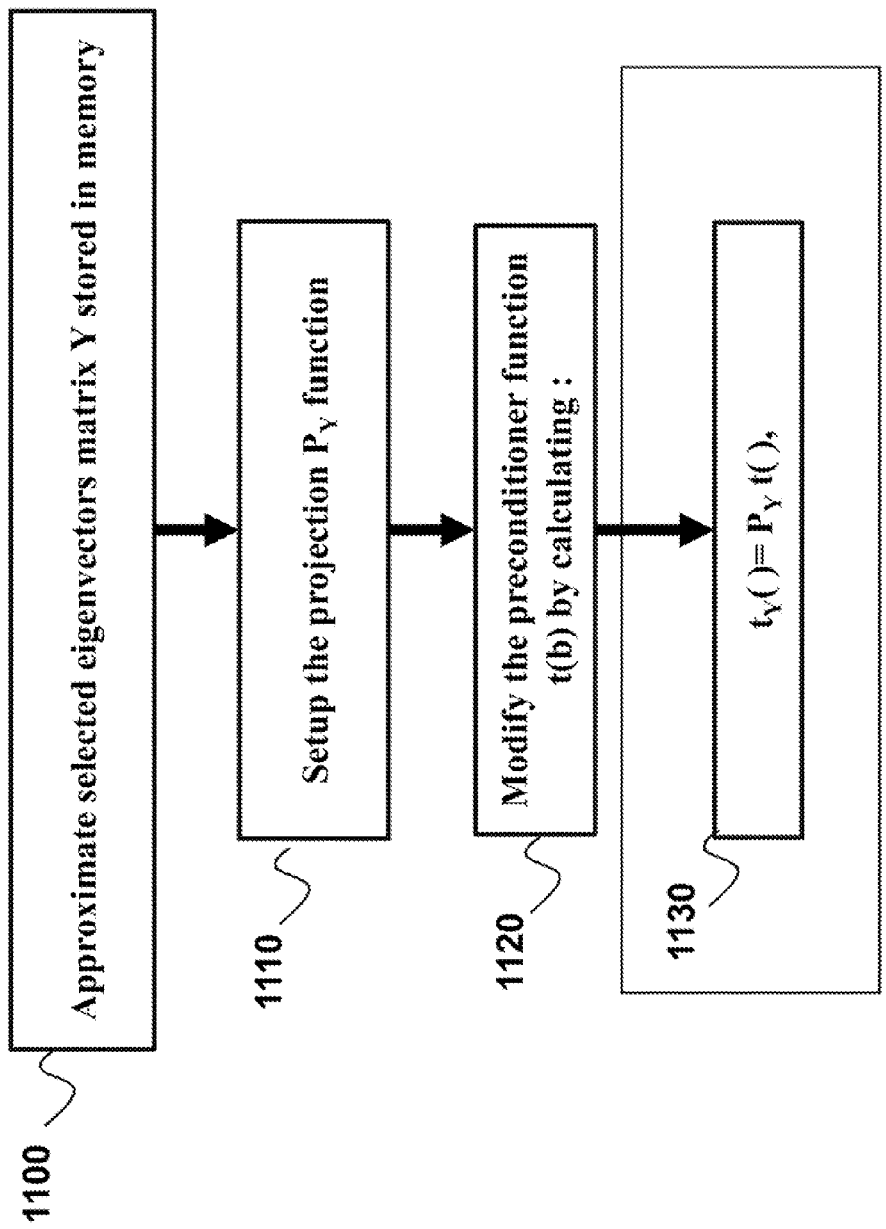
FIG. 11 is a diagram of another embodiment that uses the eigenvalue decomposition to modify a preconditioner function.

FIG. 11 shows another embodiment that modifies 1120 the preconditioning function t( ) by using the eigenvalue or singular value decomposition of the matrix t(A). This embodiment is based on a realization that, if the preconditioner has not been updated for several time steps, its quality deteriorates, resulting in slowing the convergence of the preconditioned iterative method for solving Ax=b. Mathematically, such a slowdown is related to the increase in the condition number of the matrix t(A), and can be cured by modifying the preconditioner deflating or augmenting several (using a threshold) singular or eigenvectors Y 1100 of the matrix t(A) that are responsible for the slow convergence.

For example, let the preconditioner T be symmetric positive definite, such as AVP, and let Y denote a matrix 1100, with columns—eigenvectors corresponding to several smallest and several largest by absolute value eigenvalues of t(A). These eigenvectors may, for example, be computed at the previous time step. One embodiment modifies 1120 the preconditioning function t( ) into a new preconditioning function $t_Y($ ), using deflation to remove the eigenvectors contained in Y from consideration, and thus to accelerate the convergence of the preconditioned iterative solver. For example, the embodiment can mathematically 1130 define $t_Y($ ) as $t_Y=P_Y\ t($ ), where $P_Y$ is a projector 1110 on the $T^{-1}$ orthogonal complement to the range of the matrix Y.

Additionally or alternatively some embodiments are based on realization that a slow convergence of an iterative solver for the matrix equation Ax=b may be originated from a small dimensional subspace. Detecting this subspace and deflating it in the preconditioner function can accelerate the convergence of the iterative solver. This subspace is related to eigenvectors of the error propagation operator and can be computed at the previous time step or during the course of iterations. Since the exact coefficient function changes on every time step, one embodiment updates at least a part of the deflating subspace during and concurrently, i.e. in parallel, to the execution of the iterative solver for solving the CMPC matrix equation Ax=b.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

APPENDIX A

As a specific example of mathematical formalism of CNMPC we consider here a slightly extended version of the problem in the original paper by Ohtsuka, 2004:

| formulas here | v.s. | Ohtsuka's paper |
|---|---|---|
| $\min_{u,p} J,$ | | $\min_{u,p} J,$ |
| $J = \phi(t+T, x(t+T), p) +$ | | $J = \phi(t+T, x(t+T)) +$ |
| $\int_t^{t+T} L(t', x(t'), u(t'), p) dt'$ | | $\int_t^{t+T} L(t', x(t'), u(t')) dt'$ |
| s.t. | | s.t. |
| $\dot{x} = f(t, x(t), u(t), p)$ | | $\dot{x} = f(t, x(t), u(t))$ |
| $C(t, x(t), u(t), p) = 0$ | | $C(t, x(t), u(t)) = 0$ |
| $\psi(t+T, x(t+T), p) = 0$ | | |

Here, x=x(t) denotes the vector of state of the system, serving as an initial state for the optimal control problem over the horizon. The vector u=u(t) is the control input vector, serving as an input control for the optimal control problem over the horizon. The scalar function J is the system performance cost that we want to minimize, which includes a terminal cost (the first term in the sum) and a cost over a receding time horizon (the second term in the sum). The equation for the first time derivative of the state vector (denoted by the "dotted" x) is the system dynamic model that may be nonlinear in x and/or u. The equation with constraint vector function C describes the equality constraints for the state x and control u. We add one extra constraint, described by the terminal constraint function ψ, and a parameter p. The horizon time length value T may in principle also depend on t, but do not consider such a possibility here to simplify the notation.

The continuous formulation of the optimal control problem above is discretized, to be suitable to computer solution, as follows. We introduce a uniform horizon time grid by dividing the horizon into N horizon time steps of the size Δt and replace the time-continuous vector functions x(t) and u(t) with their indexed values $x_i$ and $u_i$ at the grid points. Thus, N is a number of artificial time steps for the optimal control problem over the horizon. We approximate the integral in the cost over a receding time horizon by a simple quadrature rule. We approximate the first time derivative of the state vector by a finite difference formula. The connection of the definitions of discretized optimal control problem thus is

| formulas here | v.s. | Ohtsuka's paper |
|---|---|---|
| $\min_{u_i,p} J,$ | | $\min_{u_i,p} J,$ |
| $J = \phi(t_N, x_N, p) +$ | | $J = \phi(t_N, x_N) +$ |
| $\sum_{i=0}^{N-1} L(t_i, x_i, u_i, p)\Delta t,$ s.t. | | $\sum_{i=0}^{N-1} L(t_i, x_i, u_i)\Delta t,$ s.t. |
| $x_{i+1} = x_i + f(t_i, x_i, u_i, p)\Delta t$ | | $x_{i+1} = x_i + f(t_i, x_i, u_i)\Delta t$ |
| $(i = 0 \to N-1)$ | | $(i = 0 \to N-1)$ |
| $C(t_i, x_i, u_i, p) = 0$ | | $C(t_i, x_i, u_i) = 0$ |
| $(i = 0 \to N-1)$ | | $(i = 0 \to N-1)$ |
| $\psi(t_N, x_N, p) = 0$ | | |

We note that we have only so far discretized N MPC optimal control problem in the horizon time. We discretize the system time t later, using for simplicity of presentation the same uniform grid with the time step size Δt. More generally, the discretized NMPC optimal control problem discretization in the horizon time may be different from the time discretization of the system.

Denoting the costate (also called by Ohtsuka the Lagrange multiplier) vector by λ serving here as the initial costate for the optimal control problem over the horizon, and the Lagrange multiplier vector associated with the equality constraint by μ, we introduce the so-called Hamiltonian function, as defined in control theory, $$H(t,x,\lambda,u,\mu,p) = L(t,x,u,p) + \lambda^T f(t,x,u,p) + \mu^T C(t,x,u,p).$$

To relax the terminal constraint, given by the function ψ, we introduce the Lagrange multiplier ν. We also need to introduce a vector function U(t) that combines the control input u, the Lagrange multiplier μ, the Lagrange multiplier ν, and the parameter p, all in one vector.

The discretized NMPC optimal control problem is solved by using the traditional first order necessary optimality criteria, often called the "Euler-Lagrange Equation" and alternatively as the "KKT condition", denoted here by F(t,x,U)=0. The KKT condition can derived, e.g., by applying the Lagrange method of undetermined multipliers. Mathematically, if F(t,x,U)=0, and the solution U=U(t) is unique, it is an optimal point and thus becomes a solution of the optimal control problem for the given state x=x(t). Since the control vector input u is a part of the larger vector U, the optimal solution U gives the optimal control input u.

To formally derive the KKT conditions, we can introduce the extended evaluation function $$J_{ex}(X, \Lambda) = \phi(t_N, x_N, p) + \sum_{i=0}^{N-1} L(t_i, x_i, u_i, p)\Delta t +$$

$$\sum_{i=0}^{N-1} \lambda_{i+1}^T (x_i - x_{i+1} + f(t_i, x_i, u_i, p)\Delta t) +$$

$$\sum_{i=0}^{N-1} (\mu_i \Delta t)^T C(t_i, x_i, u_i, p) + v^T \psi(t_N, x_N, p)$$

where $X=[x_i\ u_i\ p]^T$ and $\Lambda=[\lambda_i\ \mu_i\ v]^T$. We note that Lagrange multiplier for $C(t_i, x_i, u_i, p)=0$ is chosen in a somewhat inconsistent way. On the one hand, we take a set of $\mu_i \Delta t$ as the Lagrange multiplier in order to include $\Delta t$, but on the other hand we then consider only $\mu_i$ as the Lagrange multiplier instead of $\mu_i \Delta t$. We derive the KKT conditions by calculating $$\frac{\partial J_{ex}^T}{\partial X}(X, \Lambda) = 0$$

and $$\frac{\partial J_{ex}^T}{\partial \Lambda}(X, \Lambda) = 0.$$

For example, taking derivative with respect to $\mu_1$, which is $$\frac{\partial J_{ex}^T}{\partial u_i}(X, \Lambda) = 0,$$

we obtain the following equation, $$\frac{\partial J_{ex}^T}{\partial u_i}(X, \Lambda) =$$

$$\frac{\partial L}{\partial u_i}(t_i, x_i, u_i, p)\Delta t + \lambda_{i+1}^T \frac{\partial f}{\partial u_i}(t_i, x_i, u_i, p)\Delta t + \mu_i^T C(t_i, x_i, u_i, p)\Delta t = 0$$

Using the Hamiltonian notation, $$\frac{\partial H}{\partial u_i}(t_i, x_i, u_i, p)\Delta t = 0$$

Taking the derivative with respect to $\mu_i$, which is $$\frac{\partial J_{ex}^T}{\partial \mu_i}(X, \Lambda) = 0,$$

we obtain the following equation, which also has the multiplier $\Delta t$ in the end:

$$C(t_i, x_i, u_i, p)\Delta t = 0$$

Therefore, in theory, to be exact, $$\frac{\partial H}{\partial u_i}$$

and C in KKT condition should have $\Delta t$ in the end, and it makes the matrix Fu symmetric.

We note that U does not include the costate vector X, which is thus not one of the unknowns in the equation $F(t,x,U)=0$, i.e. it needs to be independently eliminated. We next describe the construction of the symbolic matrix function F, starting with the elimination procedure of the costate vector X. The vector x in the argument of $F(t,x,U)$ denotes the state vector. The current measured state x serves as the initial vector $x_0$ for the algorithm below.

1. First, we calculate all $x_i$ and $\lambda_i$ as follows:

$x_0$ is given as the current measured state $\downarrow$ $x_{i+1} = x_i + f(t_i, x_i, u_i, p)\Delta t$ (Note: $i = 0 \to N - 1$)

$\downarrow$ $$\lambda_N = \frac{\partial \phi^T}{\partial x}(t_N, x_N, p) + \frac{\partial \psi^T}{\partial x}(t_N, x_N, p) \cdot v$$

$\downarrow$ $\lambda_i = \lambda_{i+1} + \frac{\partial H^T}{\partial x}(t_i, x_i, \lambda_{i+1}, u_i, \mu_i, p)\Delta t$ (Note: $i = N - 1 \to 1$)

2. Then, calculate $F(t, x, U)$ as follows, using $x_i$ and $\lambda_i$ calculated above:

$$F(t, x, U) = \begin{bmatrix} \vdots \\ \frac{\partial H^T}{\partial u}(t_i, x_i, \lambda_{i+1}, u_i, \mu_i, p)\Delta t \\ \vdots \\ (\text{Note: } i = 0 \to N - 1) \\ \vdots \\ C(t_i, x_i, u_i, p)\Delta t \\ \vdots \\ (\text{Note: } i = 0 \to N - 1) \\ \psi(t_N, x_N, p) \} \in \mathbb{R}^{n_\psi \times 1} \\ \frac{\partial \phi_N^T}{\partial p}(t_N, x_N, p) + \frac{\partial \psi_N^T}{\partial p}(t_N, x_N, p) \cdot v + \\ \sum_{i=0}^{N-1} \frac{\partial H_i^T}{\partial p}(t_i, x_i, \lambda_{i+1}, u_i, \mu_i, p)\Delta t \end{bmatrix} \begin{matrix} \in \mathbb{R}^{(n_u \cdot N) \times 1} \\ \\ \\ \in \mathbb{R}^{(n_C \cdot N) \times 1} \\ \\ \\ \\ \in \mathbb{R}^{n_p \times 1} \end{matrix}$$

In the formulas above, the dimensions are $x_i$ and $f(t_i,x_i,u_i,p) \in \mathbb{R}^{n_x \times 1}$ $u_i \in \mathbb{R}^{n_u \times 1}$ $C(t_i,x_i,u_i,p)$ and $\mu_i \in \mathbb{R}^{n_C \times 1}$ $\psi(t_N,x_N,p)$ and $v \in \mathbb{R}^{n_\psi \times 1}$ $p \in \mathbb{R}^{n_p \times 1}$ $F(t,x,U) \in \mathbb{R}^{n_U \times 1}$ $n_U = (n_u + n_C)N + n_\psi + n_p$ where $n_x$ is the size of the vector x, $n_u$ is the size of the vector u, $n_p$ is the size of the vector p, $n_C$ is the number of conditions C, $n_\psi$ is the number of terminal conditions $\psi$. The vector $U \in \mathbb{R}^{n_U \times 1}$ is $U = [\ldots u_i^T \ldots, \ldots, u_i^T \ldots, v^T, p^T]^T.$ The scalar function $H$ is $H = L(t_i, x_i, u_i, p) + \lambda_i^T f(t_i, x_i, u_i, p) + \mu_i^T C(t_i, x_i, u_i, p).$ All functions and variables here may in general be time-dependent.

This equation needs to be solved numerically by a computer processor on each time step of MPC in real time on the controller board, which is the most difficult and challenging part of implementation of NMPC. Since the Hamiltonian function H and the constraint function C may depend nonlinear on their variables, equation $F(t,x,U)=0$ is in general nonlinear, corresponding to NMPC.

The nonlinear system of equations 113 in FIG. 1 $F(t,x,U)=0$ at each time step is solved by approximate Newton's method, using the technique of homotopy continuation, where the solution U(t) is traced by integrating a differential equation using a continuation parameter. Abusing the notation, following Ohtsuka, we now regard the time t as the continuation parameter with the initial value zero. Also, in the rest of the Appendix we swap the order of the variables from F(t,x,U) to F(U,x,t).

We choose U(0) so that $F(U(0),x(0),0)=0$, and determine the derivative of U with respect to time such that $F(U(t),x(t),t)=0$ is satisfied identically, thus we have, with some scalar $\zeta$, $\dot{F}(U(t),x(t),t) = -\zeta F(U(t),x(t),t).$  (1)

Choosing the scalar $\zeta$ positive, $\zeta > 0$, makes the zero solution $F(U(t),x(t),t)=0$ of equation (1) stable. This allows us to use nonzero $F(U(0),x(0),0)$ and to approximate equation (1) using its discretization, with respect to the continuation parameter, and still to expect the solution $F(U(t),x(t),t)$ to nearly vanish.

Equation (1) is the main differential equation of the CNMPC. To be solved numerically, equation (1) is approximated by $D_h F(U,x,t:V,y,l) = (F(U+hV,x+hy,t+h) - F(U,x,t))/h = -\zeta F(U(t),x(t),t),$  (2)

where $V = \dot{U}$ and $y = \dot{x}$ denote the "dotted" (derivatives with respect to time t of) U and x, correspondingly, and in the left-hand side $\dot{F}(U(t),x(t),t)$ in (1) is approximated in (2) by $D_h F(U,x,t:V,y,l)$, using the following definition of the forward difference directional derivative $F_U(U(t),x(t),t)W + F_x(U(t),x(t),t)w + F_t(U(t),x(t),t)s \approx D_h F(U,x,w,t:W,w,s) = (F(U+hW,x+hw,t+hs) - F(U,x,t))/h,$ as follows from the chain rule:

$\dot{F}(U, x, t) = \frac{\partial F}{\partial U}\dot{U} + \frac{\partial F}{\partial x}\dot{x} + \frac{\partial F}{\partial t} = F_U \dot{U} + F_x \dot{x} + F_t$ Plugging in the definition of $D_h F(U,x,t:V,y,l)$ into equation (2) results in a system of equations for V, which is the derivative of U with respect to time, as follows, $F(U+hV,x+hy,t+h) - F(U,x+hy,t+h) = -\zeta h F(U(t),x(t),t) - F(U,x+hy,t+h) + F(U(t),x(t),t).$  (3)

Introducing a sampling period $\Delta t = h$, we denote in $x(t+\Delta t) = x + hy$ in (3), where $y = \dot{x}(t) = f(t, x, u)$, getting from (3)

$F(U(t)+\Delta t V, x(t+\Delta t), t+\Delta t) - F(U(t), x(t+\Delta t), t+\Delta t) = -\zeta \Delta t F(U(t),x(t),t) - F(U(t),x(t+\Delta t),t+\Delta t) + F(U(t),x(t),t).$  (4)

The state x(t) can be obtained from the measurement, and $\dot{x}(t) = f(t, x, u)$ can be calculated using the already obtained state x(t) and using the control u(t) resolved in the previous time step. We note that, although we use the same notation $\Delta t$, we can choose the value $\Delta t = h$ in (4) differently compared to the time step size and the horizon time step size.

The expression in the left-hand side of equation (4) is the coefficient function $a(V) = F(U(t)+\Delta t V, x(t+\Delta t), t+\Delta t) - F(U(t), x(t+\Delta t), t+\Delta t) \approx \Delta t F_U^* V,$  (5)

which implicitly and approximately determines the coefficient matrix $A = F_U$, in the matrix equation $Ax = b$ we need to solve. The expression in the right-hand side of equation (4) is the right-hand side vector in the matrix equation $Ax = b$, i.e., $b = -\zeta \Delta t F(U(t),x(t),t) - F(U(t),x(t+\Delta t),t+\Delta t) + F(U(t),x(t),t).$ The solution vector x is determined by solving a matrix equation $Ax = b$ of the CMPC with a coefficient matrix A defined by the exact (5) coefficient function $a(x) = A^*x$ at a current time step of a control.

For some embodiments, it is important whether the matrix $A = F_U$ is symmetric. In Ohtsuka's formal definition of F, the KKT conditions include, as the top two vector equations, $$\frac{\partial H}{\partial u}(t, \vec{x}, \vec{\lambda}, \vec{u}, \vec{\mu}, \vec{p}) = 0,$$  (6)

$C(t, \vec{x}, \vec{u}, \vec{p}) = 0.$

This technically can make the matrix $A = F_U$ highly non-symmetric. In order to have $A = F_U$ symmetric, as it is expected to be for a Hessian matrix, in the definition of F(t,x,U) we need to multiply by $\Delta t$ as follows, $$\frac{\partial H}{\partial u}(t, \vec{x}, \vec{\lambda}, \vec{u}, \vec{\mu}, \vec{p})\Delta t = 0,$$

$C(t, \vec{x}, \vec{u}, \vec{p})\Delta t = 0,$ which can be seen in our definition of F above. The multiplication by $\Delta t$ is equivalent to raw-scaling of blocks of the matrix $A = F_U$, corresponding to equations (6).

It is also important to realize that, mathematically speaking, equation (4) for V may be not exactly linear with respect to V, i.e., that the coefficient matrix A, implicitly determined by the coefficient function a(V) in (5), may actually depend on V. In particular, this explains why our algorithms of explicitly computing A from a( ) for the purpose of preconditioner setup may result in a non-symmetric matrix. Such a dependence and the deviation from symmetry get smaller with a sampling period $\Delta t = h$, which we are free to choose. A key limitation in the choice of $\Delta t = h$ comes from the fact that the cancellation error starts picking up in the finite different evaluation of the coefficient function a( ) due to inexact arithmetic of the controller processor. This is an unavoidable side effect of using the finite difference approximation of the derivative. A recommended lower bound for the value of $\Delta t = h$ can for example be $10^{-8}$ in double precision ($10^{-16}$) arithmetic, but the optimal value depends on F.

For some embodiments, we introduce a preconditioner T for the matrix $A=F_U$. The preconditioning, using the preconditioner T, can be applied directly to the matrix equation $Ax-b=0$ we need to solve as follows, $T(Ax-b)=0$. Alternatively, we can precondition equation (1) as follows $$T\dot{F}(U(t),x(t),t) = -\zeta F(U(t),x(t),t). \quad (7)$$

This results, after repeating the same manipulations as above, in the preconditioned matrix equation $TAx-c=0$, where the first term of vector $$c=-\zeta\Delta t \quad F(U(t),x(t),t)-TF(U(t),x(t+\Delta t),t+\Delta t)+TF(U(t),x(t),t),$$

is slightly different from that of the vector Tb. All our embodiments related to preconditioning are equally applicable to either equation (1) or (7).

At least a part of the preconditioner T may be (implicitly) determined using an approximate coefficient function as $a_{approx}(x) \approx T^{-1}x$, wherein the approximate coefficient function $a_{approx}(\,)$ applied to a vector x approximates a result of an application a(x) of the exact coefficient function a( ) to the vector x, i.e., $a_{approx}(x) \approx a(x)$. For example, the approximate coefficient function $a_{approx}(\,)$ may be determined by the same formula (5) as the exact coefficient function a( ), but computed a using an arithmetic having a precision lower than a precision of an arithmetic for determining the exact coefficient function.

Additionally or alternatively, the approximate coefficient function $a_{approx}(\,)$ may be determined using a simplified solver for differential equations needed to calculate the values of F(t,x,U), wherein the simplified solver is faster, but less accurate than a solver for determining the exact coefficient function. For example, the evaluation of F(t,x,U) involves a solver for the differential equation $$\dot{x}=f(t,x(t),u(t),p)$$

describing the state x. The solver used in the definition of F(t,x,U) is an explicit Euler method, written as follows, $$x_{i+1}=x_i+f(t_i,x_i,u_i,p)\Delta t \text{ (Note: } i=0 \to N-1)$$

which calculates the values $x_1, \ldots, x_N$ and requires N evaluations of the function $f(t_i, x, u_i, p)$. An example of a simplified solver to determine the approximate coefficient function $a_{approx}(\,)$ may be again the explicit Euler method, but with a twice larger $\Delta t$, i.e., $$y_{j+1}=y_j+f(t_j,y_j,u_j,p)2\Delta t \text{ (Note: } j=0 \to N/2-1)$$

where N is assumed to be even, for simplicity, and $y_0=x_0$. This simplified solver requires only N/2 evaluations of the function $f(t_j, y_j, u_j, p)$, i.e., may be twice faster compared to the original explicit Euler method. It gives only a half of the needed values, so we further define, e.g., $$z_{2j}=y_j, z_{2j-1}=(y_j+y_{j-1})/2, \text{ (Note: } j=1 \to N/2-1)$$

Thus, this simplified solver calculates the values $z_1, \ldots, z_N$, which may only approximate the values $x_1, \ldots, x_N$ but the calculation of the values $z_1, \ldots, z_N$ may be twice faster on the controller compared to the calculation of the values $x_1, \ldots, x_N$.

Another example is the approximate coefficient function $a_{approx}(\,)$ determined using an approximation of the function F(t,x,U), based on the approximate model of the system, where the system dynamic model, given by the function f, that may be approximated, as well as the constraint functions C and the terminal constraint function ψ. The approximate model of the system is determined to be faster to evaluate on the controller, but it may be less accurate, compared to the exact model used for determining the exact coefficient function. For example, one or a combination of functions f, C, and ψ, may be replaced with its approximation, determined by a short Taylor expansion, e.g., let $f(t,x,u,p)=\exp(t)$, then $f=\exp(t)$ can be approximated by $f_{approx}=1+t+t^2/2$ for small t.

Additionally or alternatively, the approximate coefficient function $a_{approx}(\,)$ may be the exact coefficient function a( ) determined for a different time step of the control or a combination of exact coefficient functions a( ) determined for several different time steps of the control. For past time steps, the exact coefficient function a( ) has been already computed and may be available in the controller memory. For future time steps of the control during the current time step of the control the data, e.g., the state x, for the future time steps needed to determine the approximate coefficient function $a_{approx}(\,)$ may be predicted based on a model of the system. The combination of exact coefficient functions a( ) determined for several different time steps of the control may, for example, be their average.

We claim:

1. A method for a continuation model predictive control (CMPC) of a system by a controller having at least one processor and a memory, comprising:
   selecting from the memory a model of the system, an approximate coefficient function and an exact coefficient function, wherein the approximate coefficient functions applied to a vector returns a product of an approximate coefficient matrix and the vector, and wherein the exact coefficient functions applied to the vector returns a product of an exact coefficient matrix and the vector;
   determining at least a part of a preconditioner using the approximate coefficient function;
   determining a solution vector by solving a matrix equation of the CMPC with a coefficient matrix defined by the exact coefficient function at a current time step of a control using an iterative method with the preconditioner; and
   generating a control signal for controlling the system by the controller using the solution vector.

2. The method of claim 1, further comprising:
   determining the approximate coefficient function and the preconditioner using an arithmetic having a precision lower than a precision of an arithmetic for determining the exact coefficient function.

3. The method of claim 1, further comprising:
   determining the approximate coefficient function using a simplified solver for differential equations, wherein the simplified solver is faster, but less accurate than a solver for determining the exact coefficient function.

4. The method of claim 1, further comprising:
   determining the exact coefficient function using a model of the system;
   approximating the model of the system; and
   determining the approximate coefficient function using the approximate model of the system.

5. The method of claim 1, wherein the approximate coefficient function is the exact coefficient function determined for a different time step of the control.

6. The method of claim 1, further comprising:
   determining the preconditioner using multiple approximate coefficient functions.

7. The method of claim 1, further comprising:
determining each entry of an approximate coefficient matrix using one or combination of the approximate coefficient function and the exact coefficient function, wherein the approximate coefficient functions applied to a vector returns a product of the approximate coefficient matrix and the vector, and wherein the exact coefficient functions applied to the vector returns a product of an exact coefficient matrix and the vector; and
determining the preconditioner using the approximate coefficient matrix.

8. The method of claim 7, wherein the solving is performed by a controller processor during a main control routine, further comprising:
determining one or a combination of the approximate coefficient matrix and the preconditioner in parallel with the main control routine using an at least one additional processor.

9. The method of claim 7, wherein the approximate coefficient matrix is determined during a previous time step of the control, further comprising:
updating at least a part of the approximate coefficient matrix during the current time step of the control.

10. The method of claim 7, further comprising:
applying one or combination of the approximate coefficient function and the exact coefficient function to all individual or blocks of columns of a matrix of a size of the exact coefficient matrix to produce an intermediate matrix; and
transforming the intermediate matrix to produce the approximate coefficient matrix.

11. The method of claim 7, further comprising:
determining at least a part of the approximate coefficient matrix for a next time step of the control during the current time step of the control using the data for the next time step predicted based on a model of the system.

12. The method of claim 7, wherein determining the preconditioner comprises:
inverting the approximate coefficient matrix using an anti-triangular factorization to determine the preconditioner.

13. The method of claim 7, wherein determining the preconditioner comprises:
determining the preconditioner as a symmetric positive definite preconditioner using an eigenvalue decomposition of the approximate coefficient matrix.

14. The method of claim 1, wherein determining the preconditioner comprises:
determining the preconditioner is a symmetric positive definite preconditioner, and wherein the iterative method is a preconditioned minimal residual method.

15. The method of claim 1, wherein determining the preconditioner comprises:
determining at least a part of eigenvectors of the error propagation operator, which slow convergence of the iterative method; and
removing the eigenvectors in the preconditioner using deflation.

16. The method of claim 1, further comprising:
determining a rate of convergence of the iterative method; and
updating at least partially the preconditioner, if the rate of convergence is below a threshold.

17. The method of claim 16, wherein the updating comprises:
updating at least partially the preconditioner using results of application of the exact coefficient function to at least some of iterative vectors of the iterative method.

18. The method of claim 1, further comprising:
updating at least partially the preconditioner during an execution of the iterative method of the current time step, wherein the iterative method is restarted synchronously with the preconditioner update or is a flexible iterative method, such that the preconditioner is a variable preconditioner.

19. The method of claim 1, wherein the determining the solution vector comprises:
updating the matrix equation in the iterative method at the current time step of the control without restarting iterations of the iterative method from a previous time step of the control wherein the iterative method is a flexible iterative method, such that the matrix equation is a variable matrix equation.

20. A continuation model predictive controller (CMPC) for controlling a system according to a control signal generated at each time step, comprising:
a memory for storing a model of the system, an approximate coefficient function and an exact coefficient function, wherein the approximate coefficient functions applied to a vector returns a product of an approximate coefficient matrix and the vector, and wherein the exact coefficient functions applied to the vector returns a product of an exact coefficient matrix and the vector; and
at least one processor for determining a preconditioner using the approximate coefficient function, for solving a matrix equation with a coefficient matrix defined by the exact coefficient function using an iterative method with the preconditioner to produce a solution vector, and for generating the control signal using the solution vector.

* * * * *